(12) United States Patent
Morikawa

(10) Patent No.: US 8,045,210 B2
(45) Date of Patent: Oct. 25, 2011

(54) IMAGE PROCESSING APPARATUS, IMAGE DATA TRANSFER CONTROL METHOD AND IMAGE DATA TRANSFER CONTROL PROGRAM

(75) Inventor: Takeshi Morikawa, Takarazuka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 856 days.

(21) Appl. No.: 12/052,186

(22) Filed: Mar. 20, 2008

(65) Prior Publication Data

US 2008/0239395 A1 Oct. 2, 2008

(30) Foreign Application Priority Data

Mar. 27, 2007 (JP) ................. 2007-083071

(51) Int. Cl.
*G06K 15/00* (2006.01)
*G06F 3/12* (2006.01)

(52) U.S. Cl. ..... 358/1.16; 358/1.17; 358/437; 358/1.14; 358/1.15; 358/1.13

(58) Field of Classification Search .......... 358/1.16, 358/1.17, 1.18, 1.15, 1.14, 1.13, 1.1, 400, 358/401, 403, 404, 405, 407, 437, 444, 442, 358/443, 448, 468; 347/2, 3, 5, 14, 23; 399/1, 399/8, 9; 710/20, 40, 260, 261, 264, 263, 710/52, 53, 56; 711/158, 100, 151, 171
See application file for complete search history.

(56) References Cited

U.S. PATENT DOCUMENTS

| 6,400,464 B1 * | 6/2002 | Suehiro ................... 358/1.16 |
| 7,034,838 B2 | 4/2006 | Obata et al. |
| 2004/0125415 A1 * | 7/2004 | Michiie et al. ............ 358/444 |

FOREIGN PATENT DOCUMENTS

| JP | 2003-046704 (A) | 2/2003 |
| JP | 2003-198818 | 7/2003 |
| JP | 2004-356712 (A) | 12/2004 |

OTHER PUBLICATIONS

Notification of Reasons for Refusal in JP 2007-083071 dated Feb. 10, 2009, and an English Translation thereof.

* cited by examiner

*Primary Examiner* — Dov Popovici
(74) *Attorney, Agent, or Firm* — Buchanan Ingersoll & Rooney PC

(57) ABSTRACT

An image processing apparatus being provided with: a volatile recording medium that stores image data; a nonvolatile recording medium that stores image data; a transfer portion that transfers image data page by page between the volatile recording medium and the nonvolatile recording medium; a controller that suspends transfer of one page of first image data, lets transfer of one page of second image data interrupt, and executes transfer of that page of the second image data on a priority basis, if a request to transfer that page of the second image data is issued with a higher priority level than that page of the first image data while that page of the first image data is being transferred by the transfer portion, and then, resumes transfer of an untransferred portion of that page of the first image data after that page of the second image data is completely transferred.

12 Claims, 18 Drawing Sheets

| User Name | Document Name | Document Number | Application |
|---|---|---|---|
| PUBLIC | ImageControlSpecs | 1 | Copy |
|  | ImageControlSpecs | 2 | FAX |
|  | ... | ... | ... |
| TANAKA | ImageControlSpecs | 3 | Scan |
|  | ... | ... | ... |
| INOUE | ImageControlSpecs | 3 | Copy |
|  | ... | ... | ... |
| ... | ... | ... | ... |

In the case where image data is transferred on a priority basis

In the case where parameter information of facsimile-received image data is stored by the dosFS transfer mode on a priority basis

IMAGE PROCESSING APPARATUS, IMAGE DATA TRANSFER CONTROL METHOD AND IMAGE DATA TRANSFER CONTROL PROGRAM This application claims priority under 35 U.S.C. §119 to Japanese Patent Application No. 2007-83071 filed on Mar. 27, 2007, the entire disclosure of which is incorporated herein by reference in its entirety.

BACKGROUND OF THE INVENTION

1. Field of the Invention

The present invention relates to an image processing apparatus that is equipped with a volatile recording medium such as a work memory and a nonvolatile recording medium such as a hard disk, and is capable of transferring image data between the volatile recording medium and the nonvolatile recording medium, an image data transfer control method that is preferably used for the image processing apparatus, and an image data transfer control program stored in a computer readable recording medium to make a computer of the image processing apparatus execute image processing.

2. Description of the Related Art

The following description sets forth the inventor's knowledge of related art and problems therein and should not be construed as an admission of knowledge in the prior art.

As proved by the present widespread diffusion of multi-functional digital machines such as MFPs (Multi Function Peripherals), image processing apparatuses having a plurality of functions such as copying, FAX transmission/reception and etc., have become generally used. Further, such a conventional image processing apparatus is used to store page by page, image data read out from a document by a document reader, image data received from an external apparatus to be printed, facsimile-received image data, image data to be facsimile-transmitted and other image data, temporarily in a volatile recording medium such as a work memory then in a nonvolatile recording medium such as a hard disk, in order to read out the image data from the hard disk to the work memory and output (printed or transmitted) it later when necessary.

With such a conventional image processing apparatus, a request to transfer one page of image data between the work memory and the hard disk may be issued while other image data is being transferred page by page between the work memory and the hard disk. Even if the request is issued with a high priority level, it is suspended until the ongoing transfer is completed, which is inconvenient.

For example, if image data is facsimile-received while image data read out from a document is being transferred from the work memory to the hard disk according to a copy job, a request to transfer the received image data from the work memory to the hard disk is suspended until one page of the readout image data is completely transferred. That makes the FAX reception time (communication time) longer, and thereby productivity of the receiver FAX would be reduced and a higher communication cost would be charged to the sender FAX, which is inconvenient.

Further for example, if FAX transmission of image data is started while image data read out from a document is being transferred from the work memory to the hard disk according to a copy job, a request to transfer from the hard disk to the work memory the image data to be facsimile-transmitted is suspended until one page of the readout image data is completely transferred. That also makes the FAX transmission time (communication time) longer, and thereby productivity of the receiver FAX would be reduced and a higher communication cost would be charged to the sender FAX, which is inconvenient.

According to an art suggested by Japanese Unexamined Laid-open Patent Publication No. 2003-046704, if an external apparatus issues a transfer request with a higher priority level while image data is being transferred to another external apparatus, the ongoing transfer is suspended and the transfer to the external apparatus that issued a transfer request with a higher priority level is executed.

However, in this art disclosed in the publication above, the suspended transfer is not resumed until the request issued with a high priority level is completely executed, and thereby, it would take more time to complete the suspended transfer.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide an image processing apparatus that is capable of eliminating the inconvenience, wherein if a request to transfer one page of image data is issued with a high priority level while one page of other image data is being transferred between a volatile recording medium such as a work memory and a nonvolatile recording medium such as a hard disk, the request issued with a high priority level is on hold, or the ongoing transfer is suspended and not resumed until the request issued with a high priority level is completely executed.

It is another objective of the present invention to provide an image data transfer control method that eliminates the inconvenience, wherein if a request to transfer one page of image data is issued with a high priority level while one page of other image data is being transferred between a volatile recording medium such as a work memory and a nonvolatile recording medium such as a hard disk, the request issued with a high priority level is on hold, or the ongoing transfer is suspended and not resumed until the request issued with a high priority level is completely executed.

It is yet another objective of the present invention to provide an image data transfer control program that is stored in a computer readable recording medium to make a computer of the image processing apparatus execute image processing by the image data transfer control method described above.

According to a first aspect of the present invention, an image processing apparatus comprises:
  a volatile recording medium that stores image data in itself;
  a nonvolatile recording medium that stores image data in itself;
  a transfer portion that transfers image data page by page between the volatile recording medium and the nonvolatile recording medium;
  a controller that suspends transfer of one page of first image data, lets transfer of one page of second image data interrupt, and executes transfer of that page of the second image data on a priority basis, if a request to transfer that page of the second image data is issued with a higher priority level than that page of the first image data while that page of the first image data is being transferred by the transfer portion, and then, resumes transfer of the untransferred portion of that page of the first image data after that page of the second image data is completely transferred.

According to a second aspect of the present invention, an image data transfer control method comprises:

suspending transfer of one page of first image data that is transferred page by page, letting transfer of one page of second image data that is also transferred page by page, interrupt, and executing transfer of that page of the second image data on a priority basis, if a request to transfer that page of the second image data is issued with a higher priority level than that page of the first image data while that page of the first image data is being transferred between a volatile recording medium and a nonvolatile recording medium storing image data in their selves; and resuming transfer of the untransferred portion of that page of the first image data after that page of the second image data is completely transferred.

According to a third aspect of the present invention, an image data transfer control program stored in a computer readable recording medium to make a computer of an image processing apparatus execute:

suspending transfer of one page of first image data that is transferred page by page, letting transfer of one page of second image data that is also transferred page by page, interrupt, and executing transfer of that page of the second image data on a priority basis, if a request to transfer that page of the second image data is issued with a higher priority level than that page of the first image data while that page of the first image data is being transferred between a volatile recording medium and a nonvolatile recording medium storing image data in their selves; and resuming transfer of the untransferred portion of that page of the first image data after that page of second image data is completely transferred.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
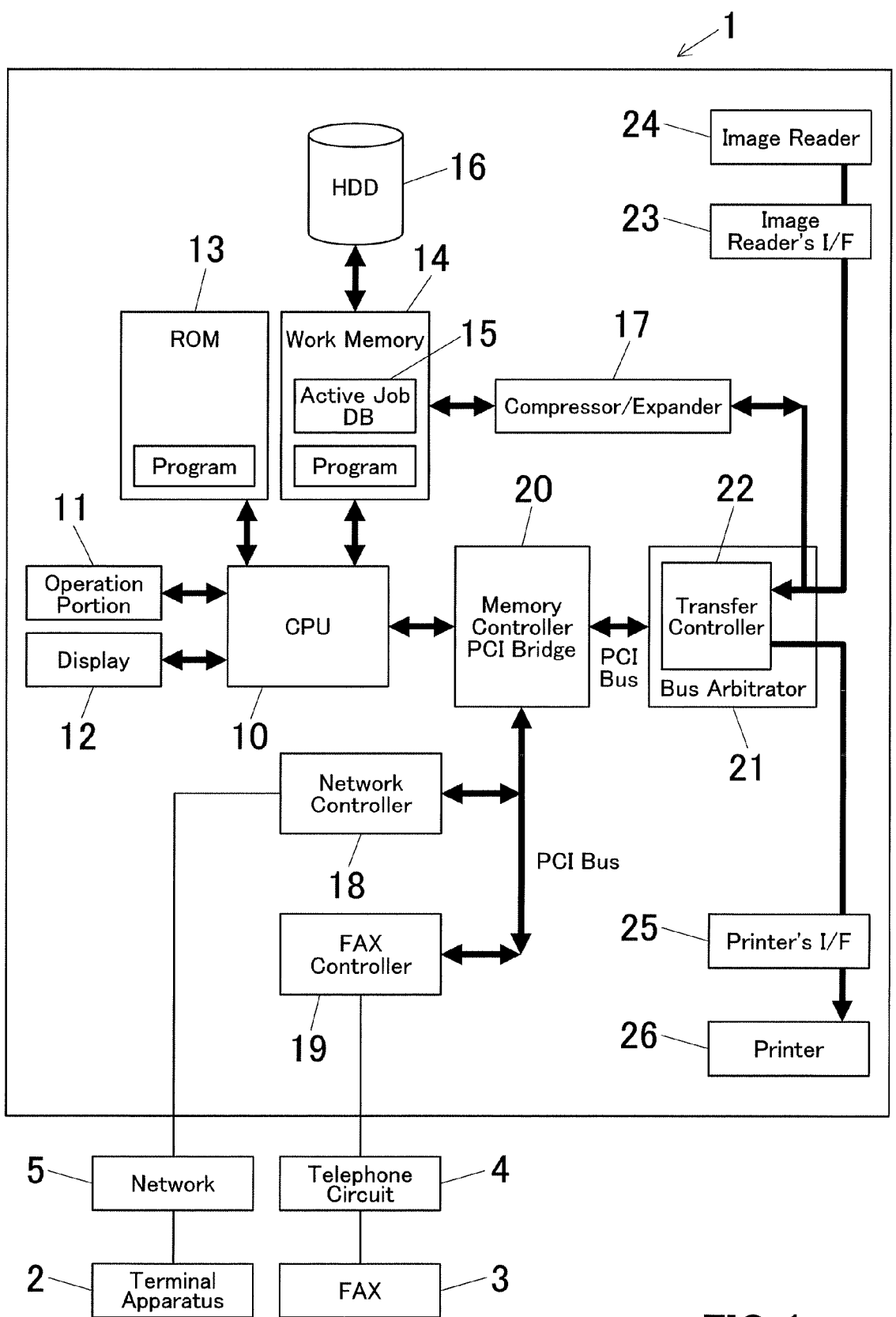
FIG. 1 is a block diagram showing a configuration of an image processing apparatus according to one embodiment of the present invention.

FIG. 1 shows a configuration of an entire image processing apparatus 1 according to one embodiment of the present invention.

The image processing apparatus 1 is connected to a terminal apparatus 2 that is a personal computer (hereinafter to be referred to as "PC") via a network 5, and to a FAX terminal apparatus 3 via a telephone circuit 4, respectively.

The image processing apparatus 1 is a MFP that is a multifunctional digital machine having a plurality of functions such as copying, network printing, scanning, FAX transmission/reception and etc. And by using those functions, the image processing apparatus 1 performs various operations according to user instructions given directly via an operation portion 11 and given remotely via the network 5 from the terminal apparatus 2. Further, a hard disk (hereinafter to be referred to as "HDD") 16 that is a nonvolatile recording medium of the image processing apparatus 1, has in itself recording areas (hereinafter to be referred to as "user BOXes") each storing data such as image data for a user using the image processing apparatus 1.

The terminal apparatus 2 is a PC as mentioned above, and has document creation software for users to create documents, images and etc., and various other kinds of software including a printer driver for the image processing apparatus 1, which are all installed on itself. And if a user gives an instruction to output a document, an image or etc. after creating it by using the document creation software, the printer driver creates a print job then transmits it to the image processing apparatus 1 via the network 5.

The FAX terminal apparatus 3 performs signal processes including data compression, data modulation and etc., on image data read out from a document, then transmits the processed image data to the image forming apparatus 1 or etc. via the telephone circuit 4.

Hereinafter, a configuration of the image processing apparatus 1 will be explained.

The image processing apparatus 1 comprises a CPU 10, an operation portion 11, a display 12, a ROM 13, a work memory 14 that is a volatile recording medium, a HDD 16, a compressor/expander 17, a network controller 18, a FAX controller 19, a memory controller PCI bridge 20, a bus arbitrator 21, an image reader's interface (image reader's I/F) 23, an image reader 24, a printer's interface (printer's I/F) 25, a printer 26 and etc.

The CPU 10 controls the entire image processing apparatus 1 by executing a program stored in a recording medium such as the ROM 13 or loaded in the work memory 14. The CPU 10 will be further explained later.

The operation portion 11 comprises a plurality of keys that are used to enter numbers, text, marks and etc., a sensor that detects pressed keys, a transmission circuit that transmits to the CPU 10 signals indicating the detected keys, and etc.

Figure 2:
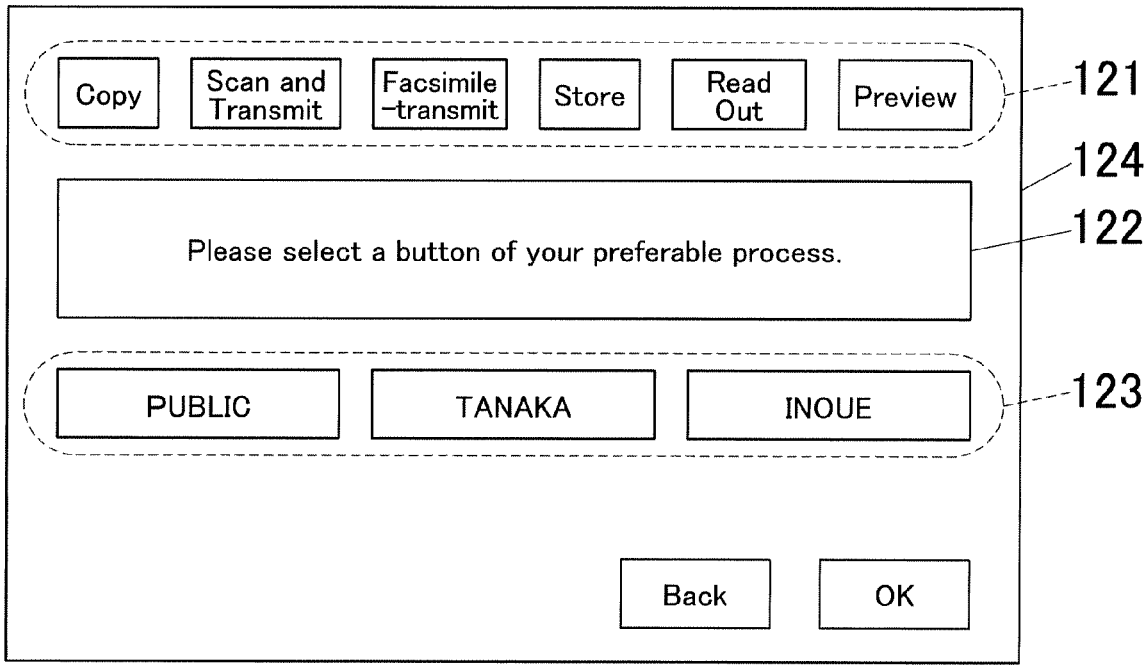
FIG. 2 is a view showing an example of a default menu screen displayed on a display.

The display 12 comprises a touch panel, and detects a location on the touch panel, which is touched with fingers by users, then transmits to the CPU 10 signals indicating the detection results. Further, the display 12 displays on itself a screen giving an instruction or a message to users, a screen letting users enter a setting or a process of the image processing apparatus, and a screen showing an image formed or a process result that is drawn by the image processing apparatus 1. As shown in FIG. 2, when the power is ON or the image processing apparatus is in the normal status, the display 12 displays on itself a default menu screen 124 showing a group of various process selection buttons 121, a message 122, user name buttons 123 and etc. Via the default menu screen 124, a user selects a preferable process by pressing a button among the group of various process selection buttons 121.

For example, if a user selects "copy", "scan and transmit", "facsimile-transmit" or "store" by pressing a button among the group of various process selection buttons 121, the screen switches to a mode setting screen letting users select among various mode settings including a setting for reading a document by the image reader 24, and the screen waits for a setting entered by the user. Specifically, if the user selects "scan and transmit" or "facsimile-transmit", the display 12 displays on itself a screen accepting a destination address, a user BOX name, a telephone number or etc., entered by the user. If the user selects "store", the display 12 displays on itself a screen accepting a destination address that is a user BOX name, and a document name, entered by the user. If the user selects "read out" or "preview", the display 12 displays on itself a screen accepting a user BOX name and a document name entered by the user, so that a document and a user BOX from which the document is read out could be identified.

Hereinafter, an example of a screen displayed if "preview" is selected, will be explained.

Figure 3:
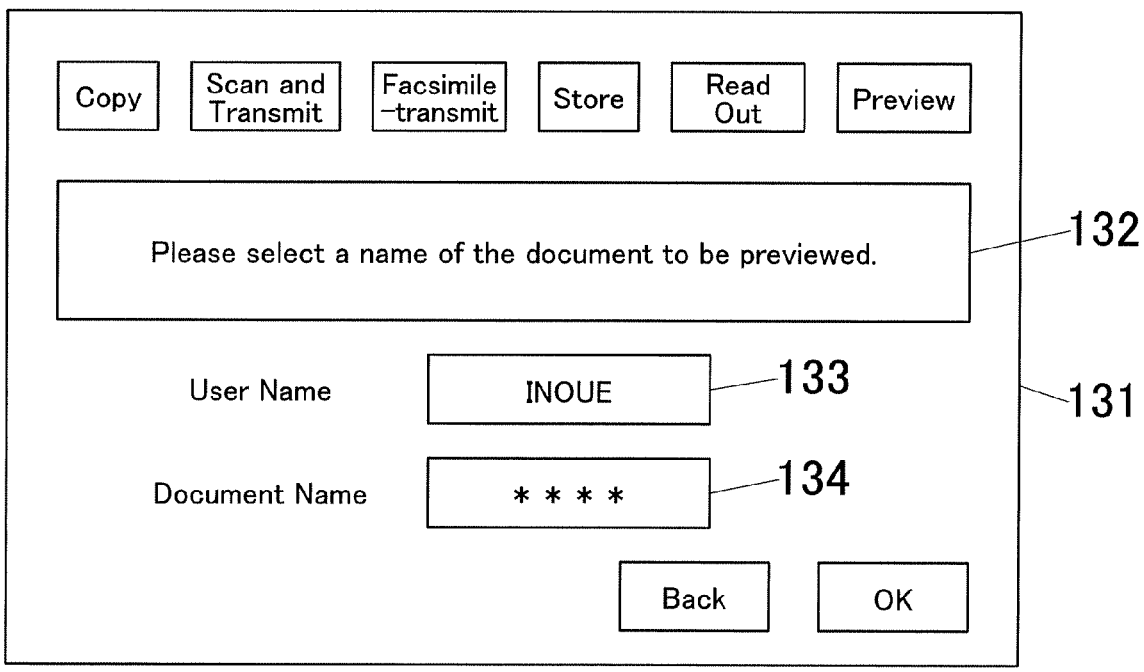
FIG. 3 is a view showing an example of a preview selection screen coming up if a preview job is selected via the default menu screen.
Figure 4:
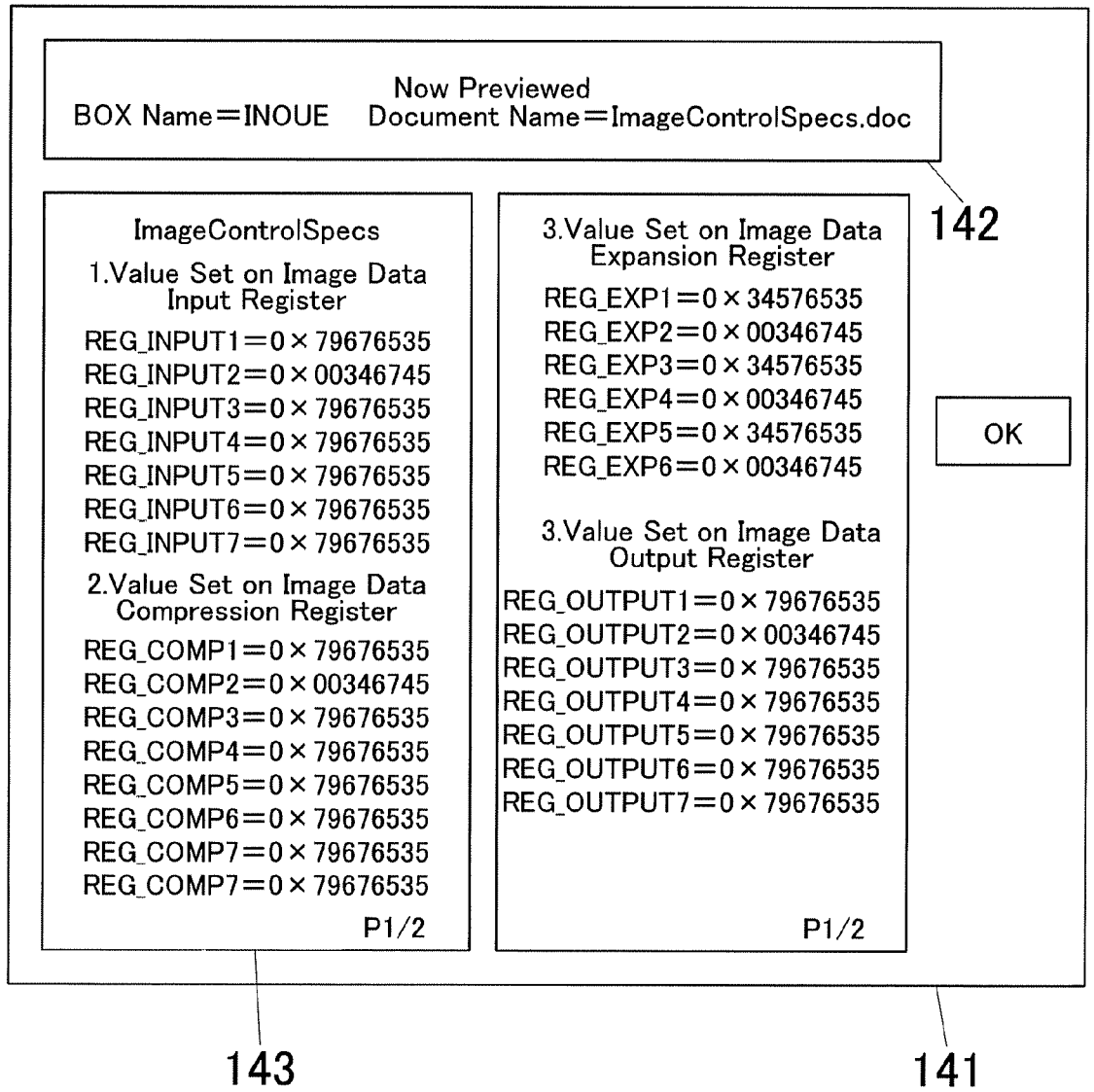
FIG. 4 is a view showing an example of a preview screen coming up if a user enters a predetermined selection via the preview selection screen.

If a user selects "preview" via the default menu screen 124 by pressing a button among the group of various process selection buttons 121 then selects "INOUE" by pressing a button among the user name buttons 123, the display 12 displays on itself a preview selection screen 131 as shown in FIG. 3. In this preview selection screen 131, a message 132, a user name field 133, a document name field 134 and etc. are displayed. If the user enters a document name, parameter information of the specified document is read out page by page from the HDD 16 by the dosFS transfer mode, and image data of the specified document is read out therefrom by the image data transfer mode. Then, the image data is outputted on the display 12 as shown in a preview screen 141 of FIG. 4. In this preview screen 141, a message 142 notifying of "on preview", an image processing spec screen 143 and etc. are displayed.

Further, the image processing apparatus 1 has a HTML conversion program to transmit to the terminal apparatus 2, screen data corresponding to the various screens displayed on the display 12, and a program to receive information from the terminal apparatus 2, which is entered by the user with screens displayed on a display of the terminal apparatus 2, which are installed thereon. These programs enable the user to read out image data stored in a user BOX, etc. of the image processing apparatus 1, by remotely making access to the user BOX from the terminal apparatus 2 that is his/her own PC, etc. And then, the image processing apparatus 1 performs the selected process on the image data.

As described above, the operation portion 11 and the display 12 work as a user interface used by users to give instructions to the image processing apparatus 1. As referred to a control block 49 in FIG. 8, this user interface is interconnected to a job generator 50, a job execution controller 51, a user authenticator 52, a BOX control processor 53 and a BOX administrator 54, and exchanges information with these portions according to an instruction directly given from the operation portion 11 or remotely given from the terminal apparatus 2 via the network controller 5.

Back to FIG. 1, the ROM 13 stores in itself a program and data to realize basic functions of the image processing apparatus 1. Concretely, the ROM 13 stores a program and data in itself to realize functions of the job generator 50, the job execution controller 51, the user authenticator 52, the BOX control processor 53, the BOX administrator 54 and etc. shown in FIG. 8. The functions of these portions will be detailed later.

The work memory 14 temporarily stores in itself image data transmitted from the terminal apparatus 2 or the FAX terminal apparatus 3, image data compressed by the compressor/expander 17 in order to be transmitted to the terminal apparatus 2 or the FAX terminal apparatus 3, and image data read out by the image reader 24 then compressed by the compressor/expander 17. The work memory 14 comprises an active job database 15 (hereinafter, "database" will be referred to as "DB").

The active job DB 15 contains information of matrix (jobs) waiting to be executed. Concretely, the active job DB 15 contains information of queues, in which each of the jobs is registered with a document number 44 and a page number 45, and the jobs are executed in order of registration.

Figures 5, 6:
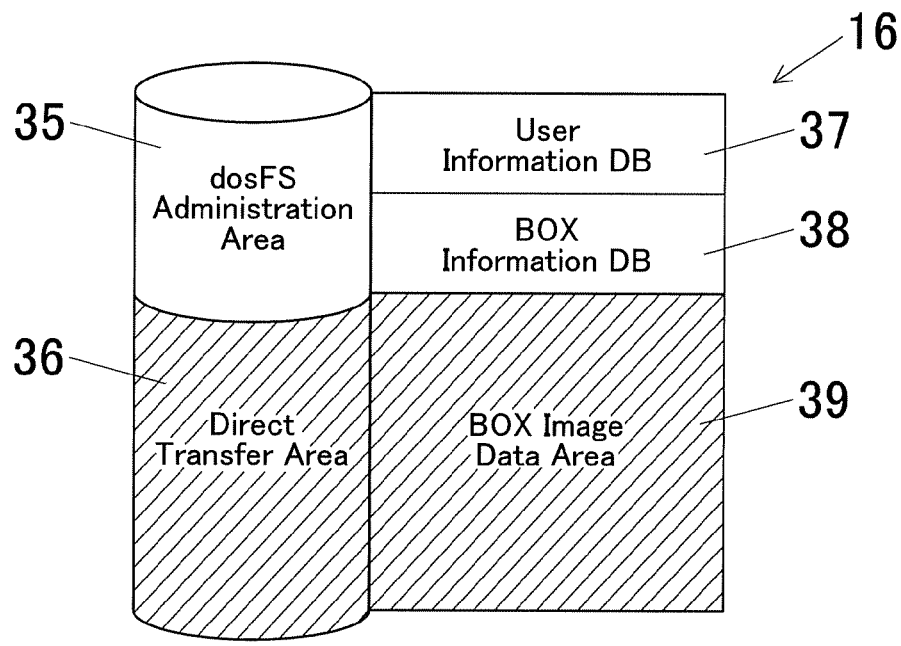
FIG. 5 is a view showing an example of a disk space usage of a HDD.
FIG. 6 is a view showing information stored in a user information database.

The HDD 16 consists of a dosFS administration area 35 that is controlled by using the Dos File System (dosFS) that is generally used, and a direct transfer area 36 storing in itself image data, as shown in FIG. 5.

The dosFS administration area 35 consists of a user information DB 37 and a BOX information DB 38, and each file stored therein can be accessed. Further, one cluster size is set to 32 KB so as to be suitable for various file systems, and thus it makes the data transfer speed comparatively slow.

The user information DB 37 consists of areas storing user names 40, document names 41, document numbers 42 and applications 43 as shown in FIG. 6, which are information of files stored in the respective user BOXes.

The user names 40 are used as identification information to identify a user when he/she intends to use the image processing apparatus 1, and used as storage information when a user specifies his/her user BOX to store image data or other, also used as address information when a user transmits image data to another user. If no user name is specified, a user name is automatically set as "PUBLIC", and all users using the image processing apparatus 1 are allowed to arbitrarily use a user BOX that is identified by this user name.

The document names 41 are information to identify a document stored in a user BOX.

The document numbers 42 are information used when a user refers to information of image data specified by a document name 41, and a document number 42 indicates a certain table stored in the BOX information DB 38. For example, if a user specifies a document with the document number of 1, information of image data in a table of the document number of 1 shown in FIG. 7, is provided to him/her.

The applications 43 indicate applications, via which image data are inputted.

Figure 7:
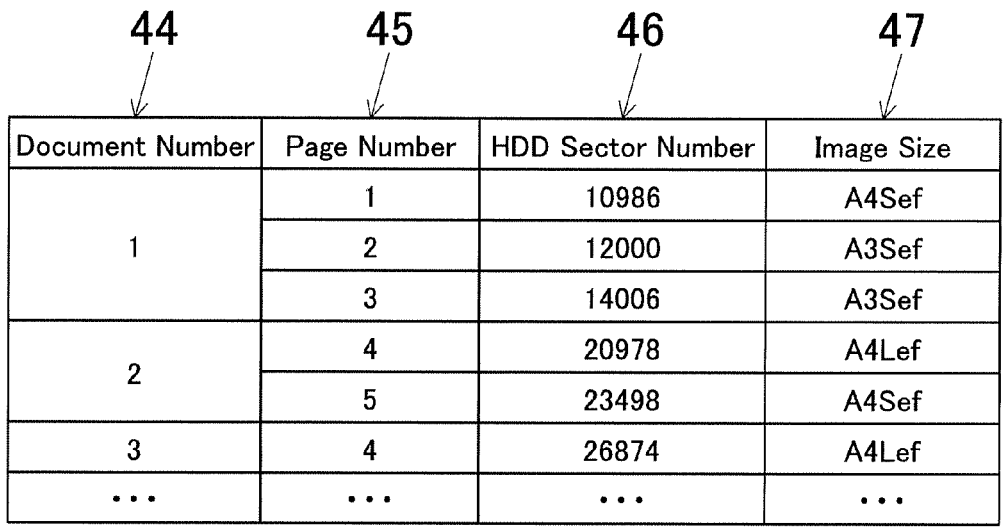
FIG. 7 is a view showing information stored in a BOX information database.

As shown in FIG. 7, the BOX information DB 38 consists of areas divided by the document numbers 44, and stores HDD sector numbers 46 indicating locations in the HDD 16, in which the respective image data specified by the page numbers 45 are stored, and necessary parameter information such as sheet size 47 and etc.

Back to FIG. 6, the direct transfer area 36 is an area storing image data in itself, and has a BOX image data area 39 therein to store image data. The direct transfer area 36 is accessed by arbitrarily specifying a sector of the HDD 16, not by the Dos File System that is generally used. And a cluster size is determined depending on a compressed size of normal image data, and thus it makes the access speed fast.

Back to FIG. 1, the compressor/expander 17 compresses a size of image data according to a setting, or expands (restores) the compressed size of image data to the original condition.

The network controller 18 receives/transmits jobs via the network 5. Concretely, the network controller 18 receives a print job and an internet FAX job transmitted via the network 5 from an external apparatus such as the terminal apparatus 2, and transmits image data read out by the image reader 24 to the terminal apparatus 2 via the network 5.

The FAX controller 19 exchanges FAX jobs with the FAX terminal apparatus 3 via the telephone circuit 4. Concretely, the FAX controller 19 receives a FAX job transmitted from the FAX terminal apparatus 3 via the telephone circuit 4, and facsimile-transmits image data read out from a document by the image reader 24, to the FAX terminal apparatus 3 via the telephone circuit 4.

The memory controller PCI bridge 20 controls conditions of data inputted in and outputted from the work memory 14, and connects the bus stretched from the CPU 10 and the PCI buses.

The bus arbitrator 21 controls transfer of image data inputted and to be outputted, by using the transfer controller 22.

The image reader 24 comprises a scanner that reads a document placed by a user, and transmits image data read out from the document to the bus arbitrator 21 by the image reader's I/F 23.

The printer 26 receives by the printer's I/F 25, image data read out by the image reader 24 and image data transmitted from the terminal apparatus 2 via the network 5, then prints the image data.

Hereinafter, jobs that can be processed by the image processing apparatus 1 will be explained.

The jobs (applications) that can be processed by the image processing apparatus 1 are a copy job, a scan job, a BOX storage job to store inputted image data in a user BOX, a FAX transmission job, a print job, a FAX reception job, a BOX readout job to read out image data from a user BOX, a preview job and etc. When these jobs are executed, image data are inputted in/outputted to certain respective portions, as described below.

When a copy job, a scan job or a FAX transmission job is executed, image data is inputted from the image reader 24, then outputted to the printer 26, the network 5, or the telephone circuit 4, respectively. When a BOX storage job is executed, image data is inputted from the image reader 24 in the same way, but not outputted to any external portion.

When a print job is executed, image data is inputted from the network 5, then outputted to the printer 26. When a FAX reception job is executed, image data is inputted from the telephone circuit 4, then outputted to the printer 26. When a BOX readout job or a preview job is executed, image data is not inputted but outputted to the printer 26 or the display 12, respectively.

Hereinafter, data flows of image data inputted/outputted when the respective jobs are executed, will be explained with reference to FIG. 1.

[Data Input]

When a copy job, a print job, a BOX storage job or a BOX transmission job is executed, image data read out by the image reader 24 is transferred to the compressor/expander 17 and compressed thereby. And the image data is temporarily stored in the work memory 14, then transferred therefrom to the HDD 16 and stored (written) therein.

When a print job is executed, image data transmitted from the terminal apparatus 2 via the network 5 is received by the network controller 18. And the image data is transferred to the work memory 14 then compressed by the compressor/expander 17. Subsequently, the image data is transferred again to the work memory 14 and temporarily stored therein, then further transferred therefrom to the HDD 16 and stored therein.

When a FAX reception job is executed, image data transmitted from the FAX terminal apparatus 3 via the telephone circuit 4 is received by the FAX controller 19. And the image data is transferred to the work memory 14 then compressed by the compressor/expander 17. Subsequently, the image data is transferred again to the work memory 14 and temporarily stored therein, then further transferred therefrom to the HDD 16 and stored therein.

[Data Output]

When a copy job, a print job, a BOX readout job or a FAX reception job is executed, image data is read out from the HDD 16. And the image data is transferred to the work memory 14 and temporarily stored therein, then expanded by the compressor/expander 17. Subsequently, the image data is transferred again to the work memory 14, then further transmitted to the printer 26 via the printer's I/F 25. And thereby, the image data is printed.

When a scan job is executed, image data is read out from the HDD 16. And the image data is transferred to the work memory 14 and temporarily stored therein, then expanded by the compressor/expander 17. Subsequently, the image data is transferred again to the work memory 14, then further transferred to the network controller 18. And then, the image data is outputted to the terminal apparatus 2 via the network 5.

When a FAX transmission job is executed, image data is read out from the HDD 16. And the image data is transferred to the work memory 14 and temporarily stored therein, then expanded by the compressor/expander 17. Subsequently, the image data is transferred again to the work memory 14, then further transferred to the FAX controller 19. And then, the image data is outputted to the FAX terminal apparatus 3 via the telephone circuit 4.

When a preview job is executed, image data is read out from the HDD 16. And the image data is transferred to the work memory 14 and temporarily stored therein, then expanded by the compressor/expander 17. Subsequently, the image data is transferred again to the work memory 14, then further transferred to the display 12.

[Functional Configuration]

Figure 8:
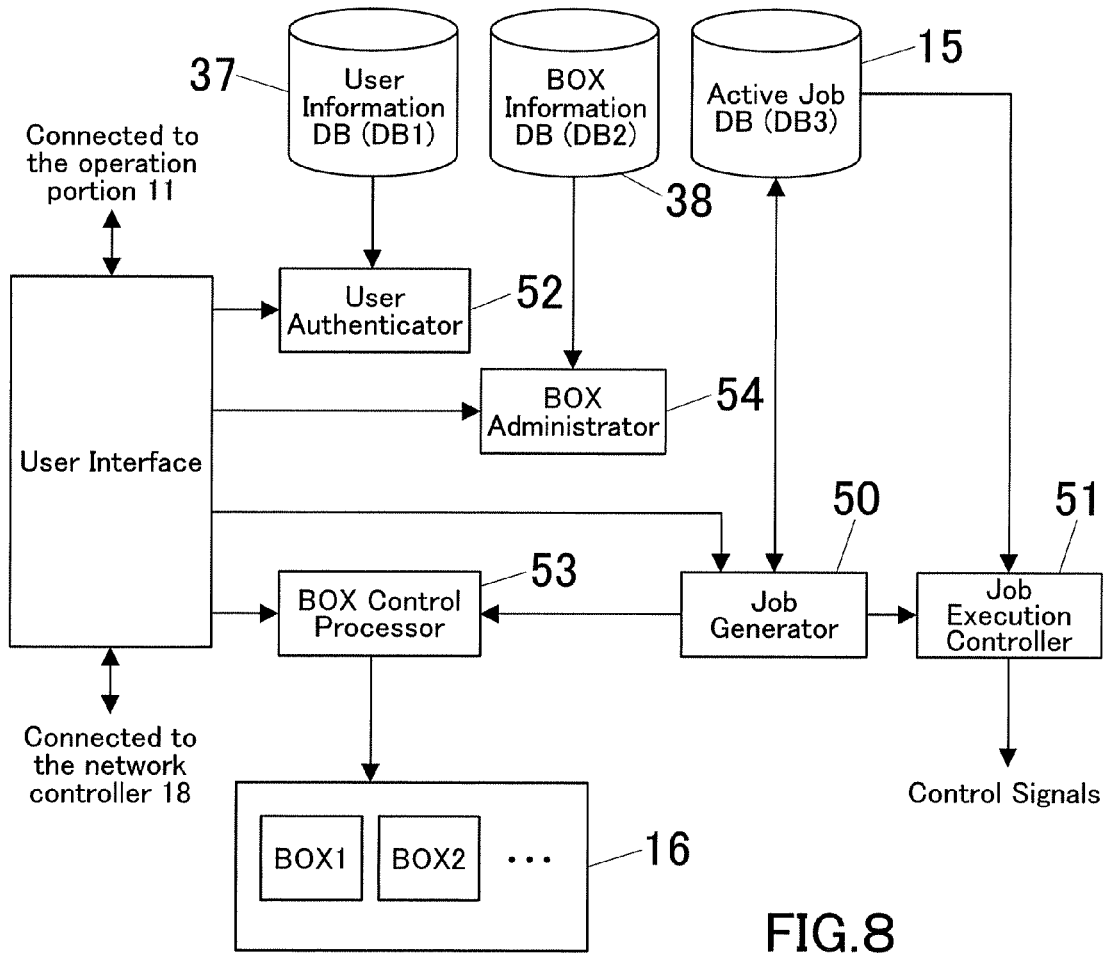
FIG. 8 is a block diagram showing a functional configuration of an image processing apparatus 1.

FIG. 8 is a block diagram showing a functional configuration of the image processing apparatus 1.

As shown in FIG. 8, the image processing apparatus 1 comprises the job generator 50, the job execution controller 51, the BOX control processor 53, the BOX administrator 54 and etc. The CPU 10 realizes functions of these portions by executing a program stored in a recording medium such as the ROM 13.

The job generator 50 judges a necessary process to input/output image data when a copy job, a scan job, a print job, a BOX storage job, a BOX readout job, a FAX transmission job, a FAX reception job or a preview job is executed, and registers the job n the active job DB 15.

The job execution controller 51 executes the registered job according to the queue of the active job DB 15, and issues a request to input/output image data page by page. In other words, the job execution controller 51 controls the overall sequence to input/output image data, which is activated when an application such as a copy job, a scan job, a FAX transmission job, a FAX reception job or etc. is executed. Further, the job execution controller 51 issues a request to input/output image data page by page, to an image data inputter/outputter.

The user authenticator 52 performs user authentication by comparing user information entered by users and user information registered in the user information DB 37, and administers user BOX names and user names that are stored in the user information DB 37.

The BOX control processor 53 performs a process to store in/read out from a user BOX.

The BOX administrator 54 administers the entire BOX information DB 38.

[Operations Performed in the Image Processing Apparatus 1]

Figure 9:
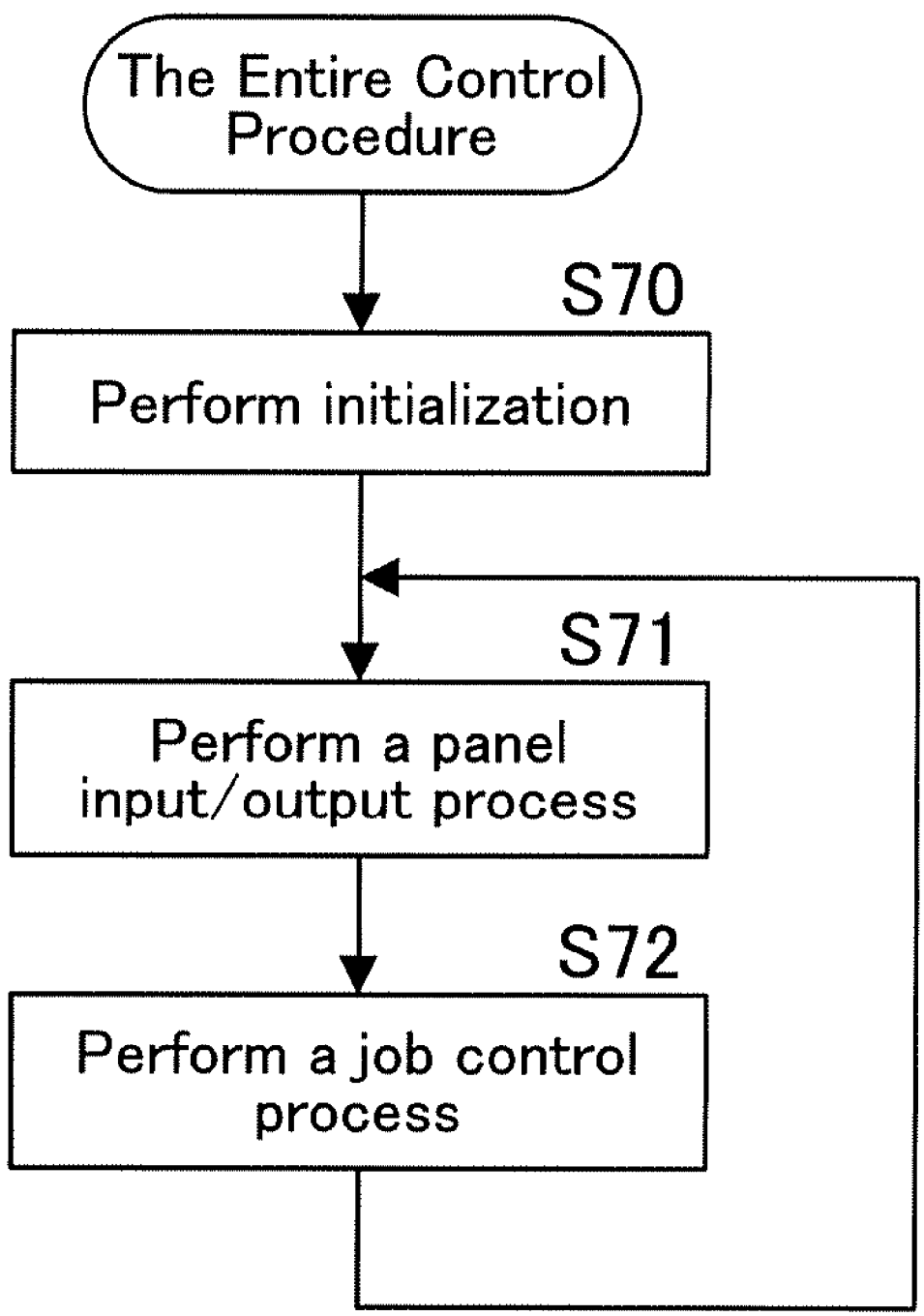
FIG. 9 is a flowchart showing a main routine executed by a CPU of the image processing apparatus.

Hereinafter, an entire procedure executed in the image processing apparatus 1 will be explained with reference to FIG. 9, which is started by turning ON the main source of electrical power. This procedure is executed by the CPU 10 according to a program stored in a recording medium such as the ROM 13. Exactly in the same way, all procedures to be explained with reference to their respective flowcharts hereinafter are executed by the CPU 10.

If the main source of electrical power is turned ON, under the control of the CPU 10, initialization is performed (Step S70). Subsequently, a panel input/output process is performed (Step S71) and a job control process is performed (Step S72). Then the routine returns to Step S71.

Hereinafter, initialization in Step S70 and a job control process in Step S72 will be explained.

In initialization of Step S70, variables numbers related to a panel input/output process, a job control process and an image data input/output process are initialized. Further, tasks to execute the sequences related to inputting/outputting image, which are a readout image input control, a network image input control, a FAX image input control, a print image output control, a network image output control, a FAX image output control, a preview image output control and a HDD transfer control by the image transfer mode, are activated. Detailed explanation about these sequences mentioned above will be provided later.

In the job control process of Step S72, three processes that are job generation, BOX control and job execution control are performed.

Job generation is performed by the job generator 50, a BOX control process is performed by the BOX control processor 53, and job execution control process is performed by the job execution controller 51. Since explanation about these processes is already provided, it is omitted here.

Hereinafter, procedures executed in the image processing apparatus 1 if image data is inputted, and procedures executed in the image processing apparatus 1 if image data is outputted, will be explained separately and respectively.

Procedures Executed if Image Data is Inputted

Procedures executed in the image processing apparatus 1 to transfer inputted image data to the HDD 16 via the work memory 14, will be explained with reference to flowcharts shown in FIG. 10 through FIG. 12.

Figure 10:
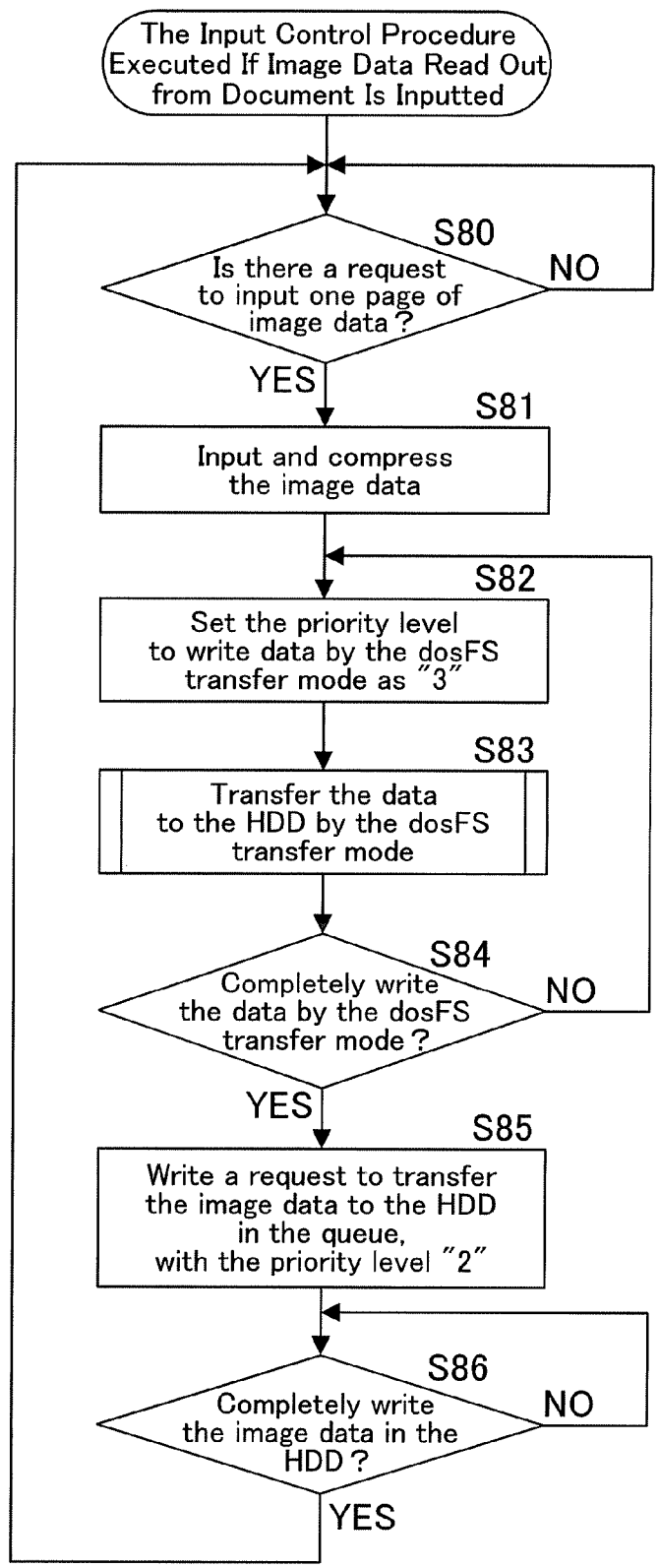
FIG. 10 is a flowchart to explain an input control procedure executed if image data read out from a document is inputted.
Figure 11:
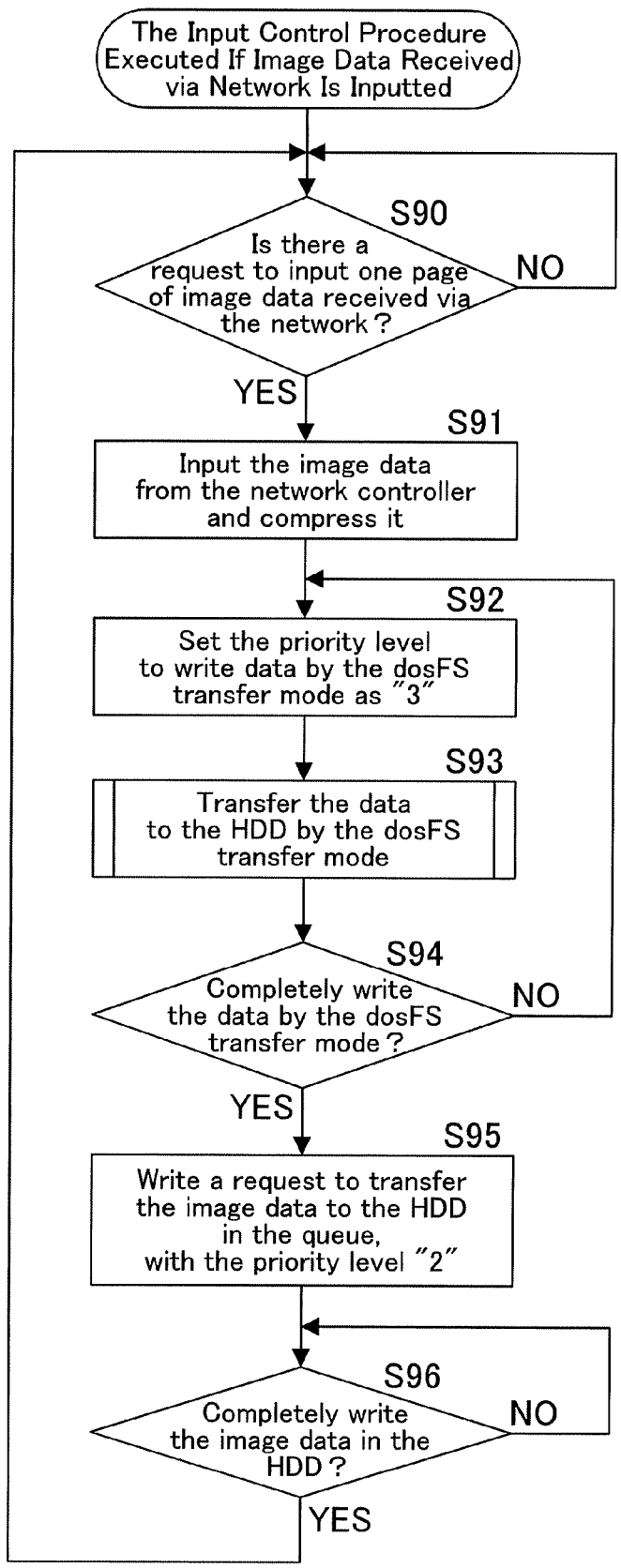
FIG. 11 is a flowchart to explain an input control procedure executed if image data received via a network is inputted.
Figure 12:
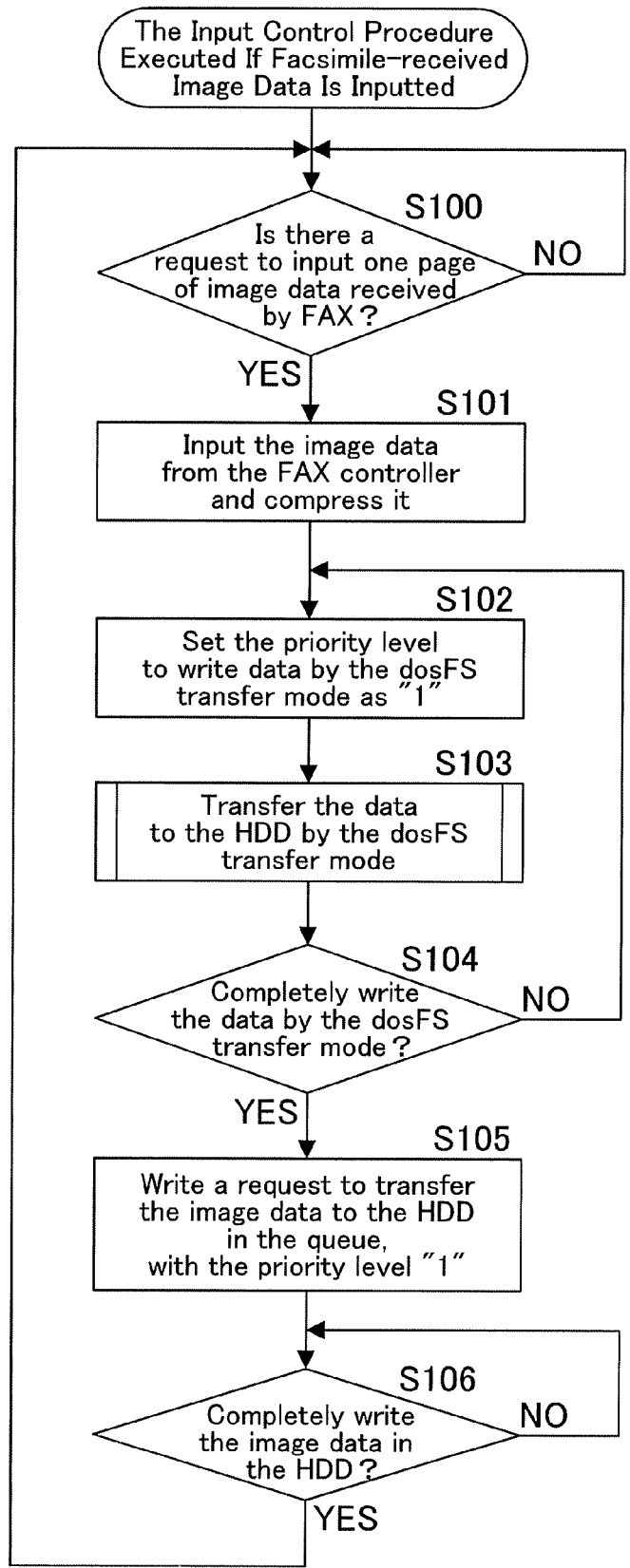
FIG. 12 is a flowchart to explain an input control procedure executed if facsimile-received image data is inputted.

The flowcharts of FIG. 10 through FIG. 12 show the procedures executed in the image processing apparatus 1, if image data read out from a document is inputted, if image data received via the network is inputted, and if facsimile-received image data is inputted, respectively. These procedures are executed according to different tasks, and can be executed simultaneously.

[Procedure Executed if Image Data Read Out from Document is Inputted]

Hereinafter, the procedure executed if image data read out by the image reader 24 is inputted, will be explained with reference to the flowchart shown in FIG. 10.

Under the control of the CPU 10, it is judged whether or not there is a request to input one page of image data (Step S80). If it is judged that there is not such a request (NO in Step S80), the routine waits until such a request is issued. If it is judged that there is such a request (YES in Step S80), under the control of the CPU 10, image data is read out from a document by the image reader 24, and thereby the image data is inputted. Then the image data is compressed by the compressor/expander 17 (Step S81). Subsequently, parameter information of the image data is transferred via the work memory 14 to the HDD 16 and stored therein, or alternatively, a priority level to read out parameter information of the image data from the HDD by the dosFS transfer mode is written therein (Step S82). The parameter information includes the HDD sector number 46 indicating locations of the image data, the sheet size 47 and etc. all of which are stored in the BOX information DB 38, as described above. In this embodiment, it is configured such that a procedure executed if image data facsimile-received is inputted should be the top priority among the procedures executed if image data is inputted. Therefore, a priority level of the dosFS transfer mode is set to "3", in the input control procedure executed if image data read out from a document is inputted. Note that the smaller numbers indicate the higher priority level of transfer processing.

Further, it is configured such that data is written (transferred) by 32 KB by the dosFS transfer mode.

Figure 17:
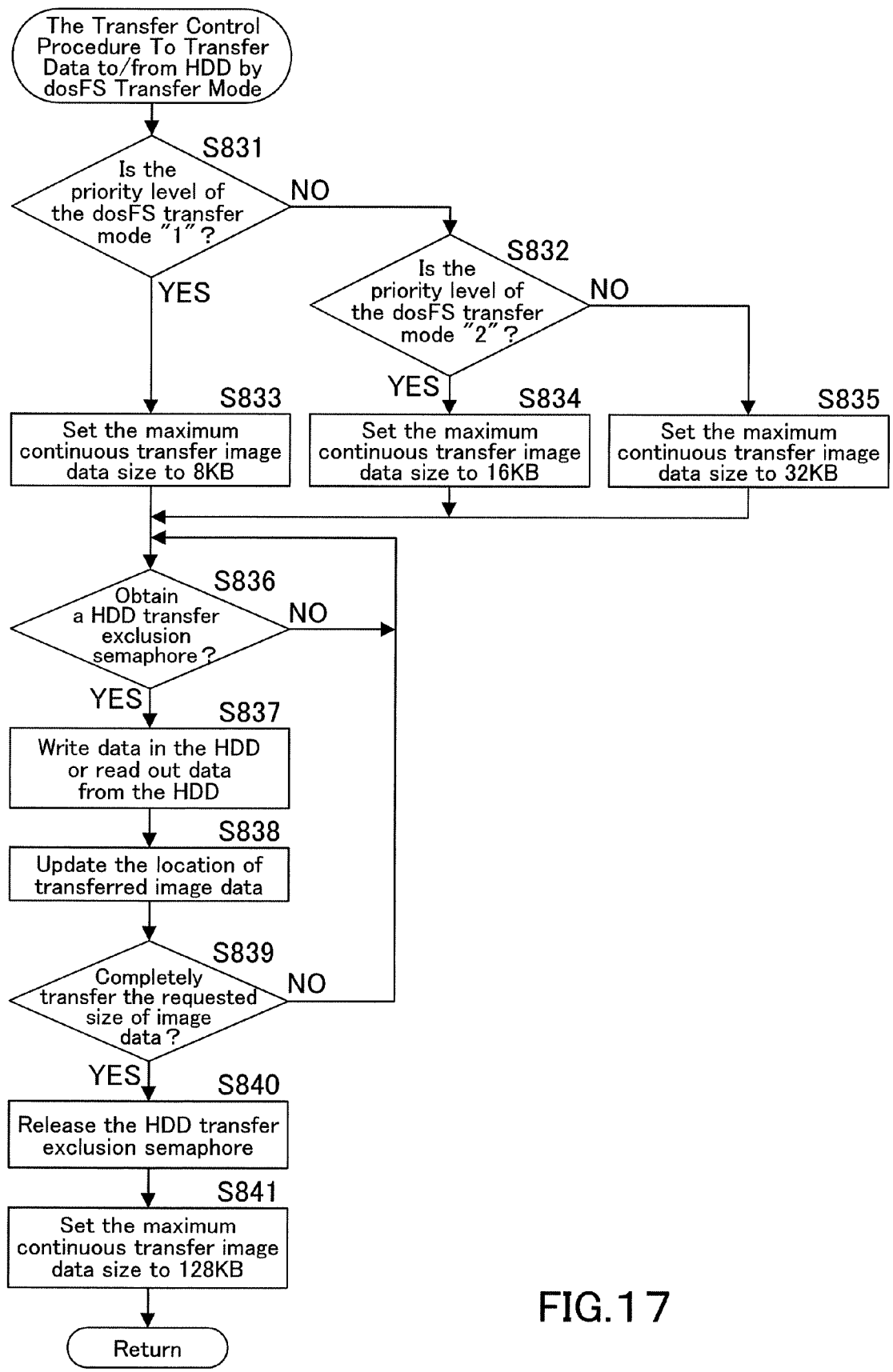
FIG. 17 is a flowchart to explain a transfer control procedure to transfer data to/from a HDD by the dosFS transfer mode.

In Step S83, under the control of the CPU 10, a transfer control procedure to transfer data to/from the HDD 16 by the dosFS transfer mode is executed according to a flowchart shown in FIG. 17. This procedure will be detailed later.

Then in Step S84, under the control of the CPU 10, it is judged whether or not necessary parameter information of one page of image data is completely written in the dosFS administration area 35. If it is judged that necessary parameter information is not yet completely written therein (NO in Step S84), the routine returns to Step S82 and repeats Steps S82 through S84 until it is completely written, since the necessary parameter is partially unwritten yet. If it is judged that necessary parameter information is completely written therein (YES in Step S84), under the control of the CPU 10, a request to transfer the inputted image data to the HDD 16 is written in the HDD image transfer queue, with the priority level "2" (Step S85). Then in Step S86, the image data is transferred to the direct transfer area 36 of the HDD 16 and stored therein.

In Step S86, under the control of the CPU 10, it is judged whether or not one page of image data is completely written in the direct transfer area 36 of the HDD 16.

If it is judged that the image data is not yet completely written therein (NO in Step S86), under the control of the CPU 10, the routine waits until it is completely written. If it is judged that the image data is completely written therein (YES in Step S86), under the control of the CPU 10, the routine returns to Step S80 and waits until a request to input a following page of image data is issued. And if such a request is issued, subsequent processes are performed similarly and accordingly as described above.

[Procedure Executed if Image Data Received Via Network is Inputted]

Hereinafter, the procedure executed if image data received from the terminal apparatus 2 via the network 5 is inputted, will be explained with reference to the flowchart shown in FIG. 11.

Under the control of the CPU 10, it is judged whether or not there is a request to input one page of image data received via the network (Step S90). If it is judged that there is not such a request (NO in Step S90), the routine waits until such a request is issued. If it is judged that there is such a request (YES in Step S90), under the control of the CPU 10, the request to input image data is accepted, and the image data is compressed by the compressor/expander 17 (Step S91). Then, a priority level of the dosFS transfer mode is written (Step S82). In this embodiment, it is configured such that a procedure executed if facsimile-received image data is inputted should be the top priority as mentioned above. Therefore, a priority level of the dosFS transfer mode is set to "3".

In Step S93, under the control of the CPU 10, a procedure to transfer data to/from the HDD 16 by the dosFS transfer mode is executed according to a flowchart shown in FIG. 17. This procedure will be detailed later.

In Step S94, under the control of the CPU 10, it is judged whether or not necessary parameter information of one page of image data, is completely written in the dosFS administration area 35. If it is judged that necessary parameter information is not yet completely written therein (NO in Step S94), the routine returns to Step S92 and repeats Steps S92 through S94 until it is completely written. If it is judged that necessary parameter information is completely written therein (YES in Step S94), under the control of the CPU 10, a request to transfer the inputted image data to the HDD 16 is written in the HDD image transfer queue, with the priority level "2" (Step S95). Then the routine proceeds to Step S96.

In Step S96, under the control of the CPU 10, it is judged whether or not the image data (one page of image data) is completely written in the HDD 16.

If it is judged that the image data is not yet completely written therein (NO in Step S96), under the control of the CPU 10, the routine waits until it is completely written. If it is judged that the image data is completely written therein (YES in Step S96), under the control of the CPU 10, the routine returns to Step S90 and waits until a request to input a following page of image data is issued.

[Procedure Executed if Facsimile-Received Image Data is Inputted]

Hereinafter, the procedure executed if image data received by the FAX terminal apparatus 3 is inputted, will be explained with reference to the flowchart shown in FIG. 12.

Under the control of the CPU 10, it is judged whether or not there is a request to input one page of facsimile-received image data (Step S100). If it is judged that there is not such a request (NO in Step S100), the routine waits until such a request is issued. If it is judged that there is such a request (YES in Step S100), under the control of the CPU10, the request to input image data from the FAX controller 18 is accepted, and the image data is compressed by the compressor/expander 17 (Step S101). Then, a priority level of the dosFS transfer mode is written (Step S102). In this embodiment, it is configured such that a procedure executed if facsimile-received image data is inputted should be the top priority as mentioned above. Therefore, a priority level of the dosFS transfer mode is set to "1".

In Step S103, under the control of the CPU 10, a procedure to transfer data to/from the HDD 16 by the dosFS transfer mode is executed according to a flowchart shown in FIG. 17. This procedure will be detailed later.

In Step S104, under the control of the CPU 10, it is judged whether or not necessary parameter information of one page of image data is completely written in the dosFS administration area 35. If it is judged that necessary parameter information is not yet completely written therein (NO in Step S104), the routine returns to Step S102 and repeats Steps S102 through S104 until it is completely written. If it is judged that necessary parameter information is completely written therein (YES in Step S104), under the control of the CPU 10, a request to transfer the inputted image data to the HDD 16 is written in the HDD image transfer queue, with the priority level "1" (Step S105). Then the routine proceeds to Step S106.

In Step S106, under the control of the CPU 10, it is judged whether or not one page of image data is completely written in the HDD 16.

If it is judged that the image data is not yet completely written therein (NO in Step S106), under the control of the CPU 10, the routine waits until it is completely written. If it is judged that the image data is completely written therein (YES in Step S106), under the control of the CPU 10, the routine returns to Step S100 and waits until a request to input a following page of image data is issued.

Procedures Executed if Image Data is Outputted

Hereinafter, procedures executed in the image processing apparatus 1, if image data is outputted to be printed, if image data is outputted via the network, if image data is facsimile-outputted, and if image data is outputted to be previewed, will be explained with reference to flowcharts shown in FIG. 13 through FIG. 16, respectively. The procedures are executed according to different tasks, and can be executed simultaneously.

[Procedure Executed if Image Data is Outputted to be Printed]

Figure 13:
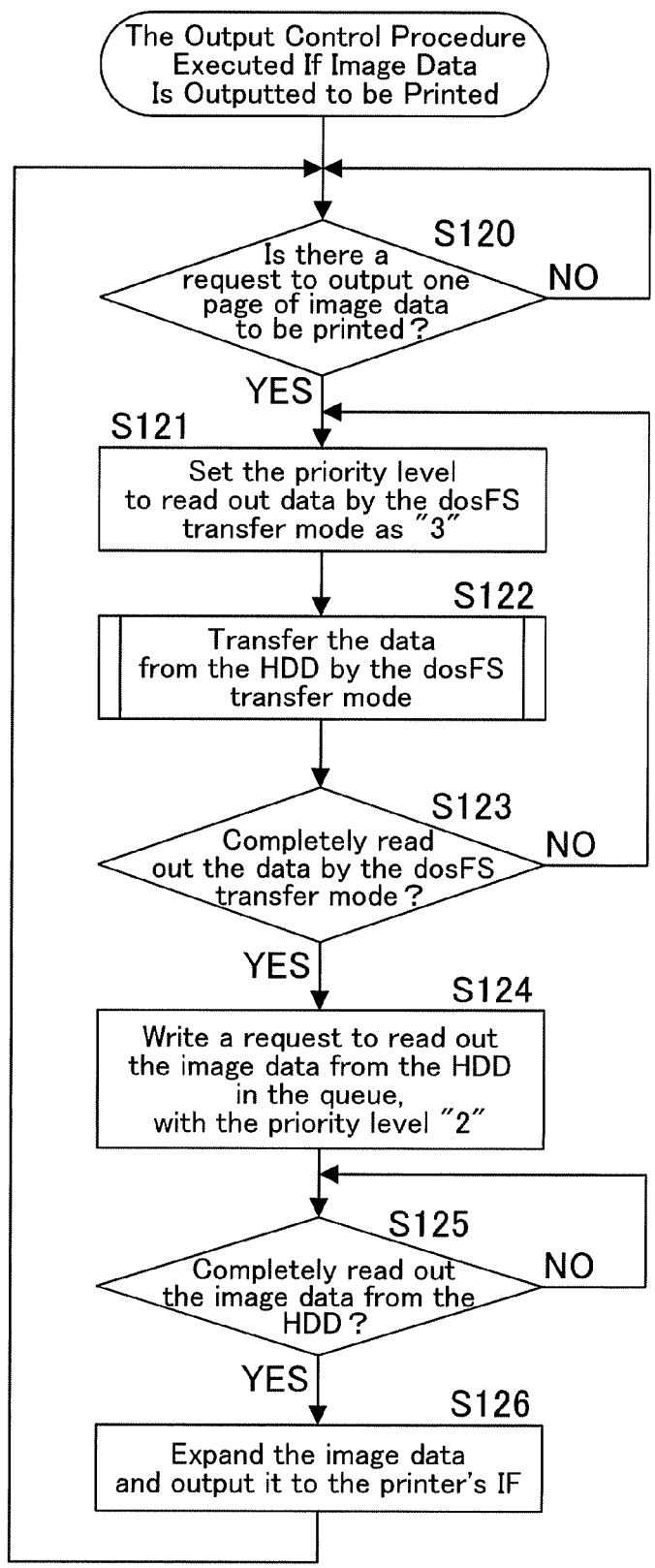
FIG. 13 is a flowchart to explain an output control procedure executed if image data is outputted to a printer.

The procedure executed if image data is outputted to the printer 26, will be explained with reference to the flowchart shown in FIG. 13.

Under the control of the CPU 10, it is judged whether or not there is a request to output one page of image data to be printed (Step S120). If it is judged that there is not such a request (NO in Step S120), the routine waits until such a request is issued. If it is judged that there is such a request (YES in Step S120), under the control of the CPU 10, parameter information of the image data is read out from the HDD 16 by the dosFS transfer mode (Step S121), so that the image data could be expanded later. In this embodiment, it is configured such that a procedure executed if image data is facsimile-outputted should be the top priority. Therefore, a priority level of the dosFS transfer mode is set to "3". Further, it is configured such that data is transferred (read out) by 32 KB by the dosFS transfer mode.

Subsequently, under the control of the CPU 10, a procedure to transfer data to/from the HDD 16 by the dosFS transfer mode is executed according to a flowchart shown in FIG. 17 (Step S122). This procedure will be detailed later.

In Step S123, under the control of the CPU 10, it is judged whether or not necessary parameter information of one page of image data is completely read out from the dosFS administration area 35. If it is judged that necessary parameter information is not yet completely read out therefrom (NO in Step S123), the routine returns to Step S121 and repeats Steps S121 through S123 until it is completely read out. If it is judged that necessary parameter information is completely read out therefrom (YES in Step S123), under the control of the CPU 10, a request to read out the image data from the HDD 16 is written in the HDD image transfer queue, with the priority level "2" (Step S124). Then the routine proceeds to Step S125.

In Step S125, under the control of the CPU 10, it is judged whether or not one page of image data is completely read out form the HDD 16.

If it is judged that the image data is not yet completely read out therefrom (NO in Step S125), the routine waits until it is completely read out therefrom. If it is judged that the image data is completely read out therefrom (YES in Step S125), under the control of the CPU 10, the readout image data is expanded by the compressor/expander 17 then outputted to the printer 26 via the printer I/F 25 (Step S126). Then the routine returns to Step S120.

[Procedure Executed if Image Data is Outputted to be Transmitted Via Network]

Figure 14:
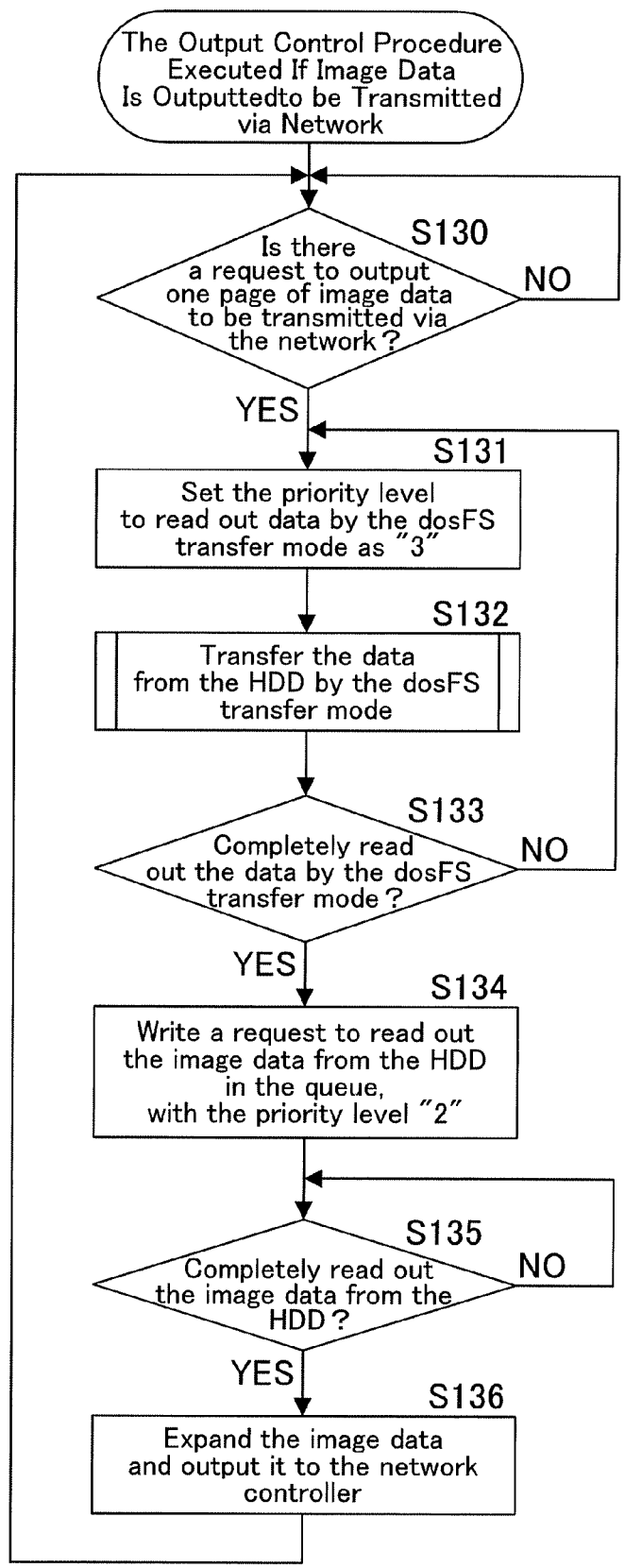
FIG. 14 is a flowchart to explain an output control procedure executed if image data is outputted via a network.

Hereinafter, the procedure executed if image data is outputted to the terminal apparatus 2 via the network 5, will be explained with the flowchart shown in FIG. 14.

Under the control of the CPU 10, it is judged whether or not there is a request to output one page of image data to be transmitted via the network (Step S130). If it is judged that there is not such a request (NO in Step S130), the routine waits until such a request is issued. If it is judged that there is such a request (YES in Step S130), under the control of the CPU 10, parameter information of the image data is read out from the HDD 16 by the dosFS transfer mode (Step S131). In this embodiment, it is configured such that a procedure executed if image data is facsimile-outputted should be the top priority. Therefore, a priority level of the dosFS transfer mode is set to "3".

Subsequently, under the control of the CPU 10, a procedure to transfer data to/from the HDD 16 by the dosFS transfer mode is executed according to a flowchart shown in FIG. 17 (Step S132). This procedure will be detailed later.

In Step S133, under the control of the CPU 10, it is judged whether or not necessary parameter information of one page of image data is completely read out from the dosFS administration area 35. If it is judged that necessary parameter information is not yet completely read out therefrom (NO in Step S133), the routine returns to Step S131 and repeats Steps S131 through S133 until it is completely read out. If it is judged that necessary parameter information is completely read out therefrom (YES in Step S133), under the control of the CPU 10, a request to read out the image data from the HDD 16 is written in the HDD image transfer queue, with the priority level "2" (Step S134). Then the routine proceeds to Step S135.

In Step S135, under the control of the CPU 10, it is judged whether or not one page of image data is completely read out from the HDD 16. If it is judged that the image data is not yet completely read out therefrom (NO in Step S135), the routine waits until it is completely read out. If it is judged that the image data is completely read out therefrom (YES in Step S135), under the control of the CPU 10, the readout image data is expanded by the compressor/expander 17 then outputted to the network controller 18 (Step S136). Then the routine returns to Step S130.

[Procedure Executed if Image Data is Outputted to be Facsimile-transmitted]

Figure 15:
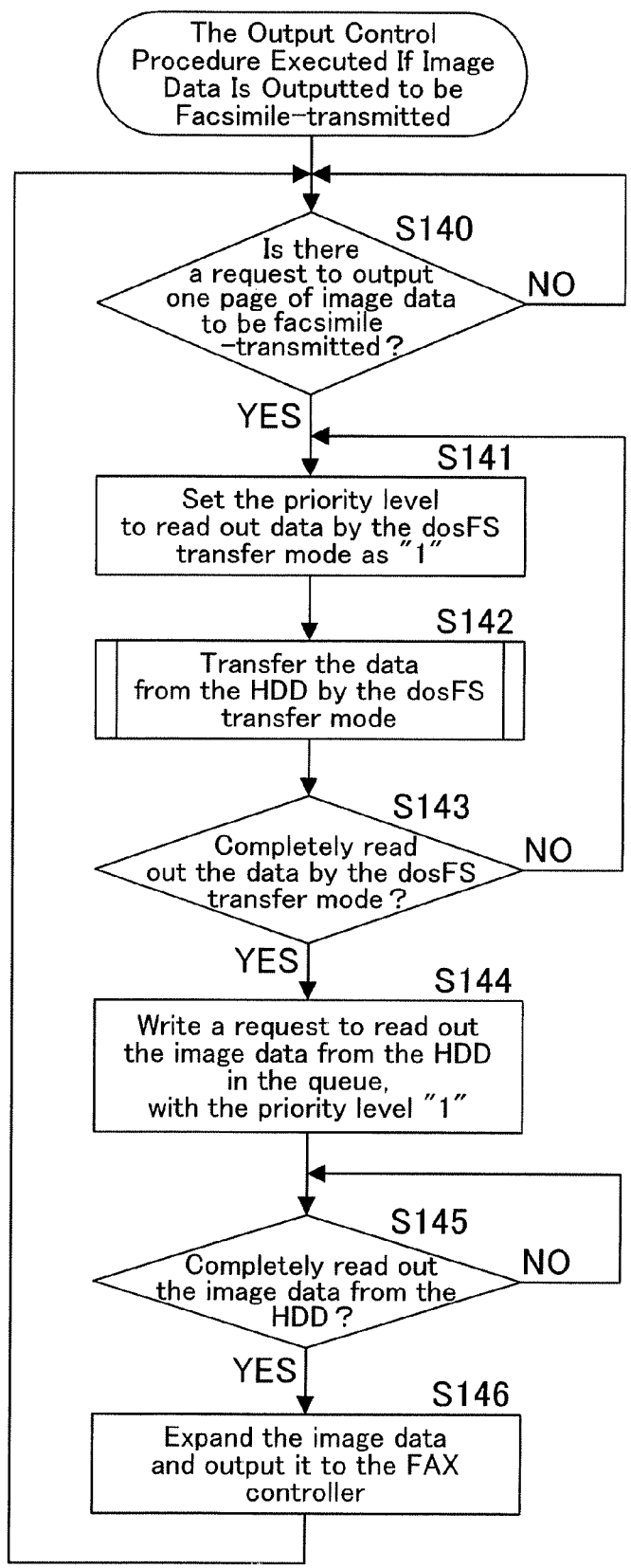
FIG. 15 is a flowchart to explain an output control procedure executed if image data is facsimile-outputted.

Hereinafter, the procedure executed if image data is outputted to the FAX terminal apparatus 3 via the telephone circuit 4, will be explained with reference to the flowchart shown in FIG. 15.

Under the control of the CPU 10, it is judged whether or not there is a request to facsimile-output one page of image data (Step S140). If it is judged that there is not such a request (NO in Step S140), the routine waits until such a request is issued. If it is judged that there is such a request (YES in Step S140), under the control of the CPU 10, parameter information of the image data is read out from the HDD 16 by the dosFS transfer mode (Step S141). In this embodiment, it is configured such that a procedure executed if image data is facsimile-outputted should be the top priority. Therefore, a priority level of the dosFS transfer mode is set to "1". Further, it is configured such that data is read out by 32 KB by the dosFS transfer mode.

Subsequently, under the control of the CPU 10, a procedure to transfer data to/from the HDD 16 by the dosFS transfer mode is executed according to a flowchart shown in FIG. 17 (Step S142). This procedure will be detailed later.

In Step S143, under the control of the CPU 10, it is judged whether or not necessary parameter information of one page of image data is completely read out from the dosFS administration area 35. If it is judged that necessary parameter information is not yet completely read out therefrom (NO in Step S143), the routine returns to Step S141 and repeats Steps S141 through S143 until it is completely read out. If it is judged that necessary parameter information is completely read out therefrom (YES in Step S143), under the control of the CPU 10, a request to read out the image data from the HDD 16 is written in the HDD image transfer queue, with the priority level "1" (Step S144). Then the routine proceeds to Step S145.

In Step S145, under the control of the CPU 10, it is judged whether or not one page of image data is completely read out from the HDD 16.

If it is judged that the image data is not yet completely read out therefrom (NO in Step S145), under the control of the CPU 10, the routine waits until it is completely read out. If it is judged that the image data is completely read out therefrom (YES in Step S145), under the control of the CPU 10, the readout image data is expanded by the compressor/expander 17 then outputted to the FAX controller 19 (Step S146). Then the routine returns to Step S140.

[Procedure Executed if Image Data is Outputted to be Previewed]

Figure 16:
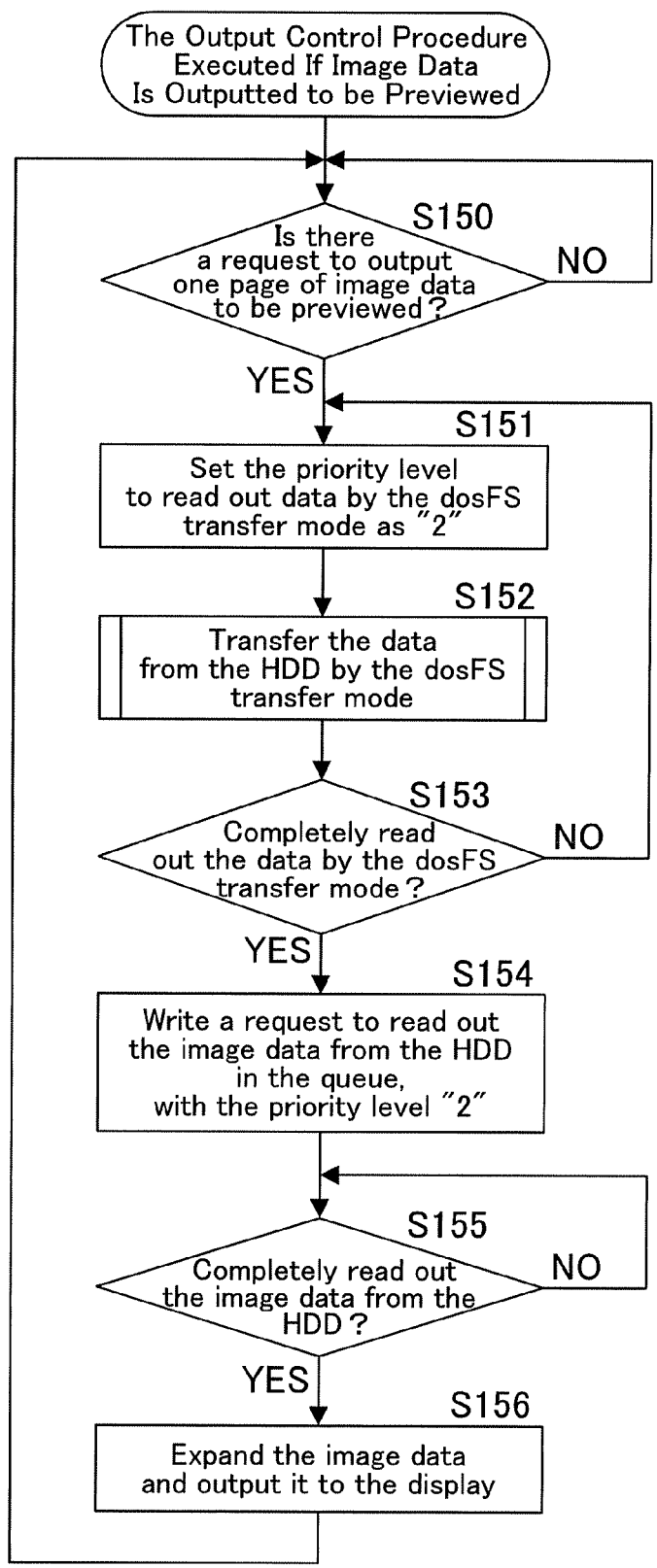
FIG. 16 is a flowchart to explain an output control procedure executed if image data is outputted to a preview screen.

Hereinafter, the procedure executed if image data is outputted to the display 12, will be explained with reference to the flowchart shown in FIG. 16.

Under the control of the CPU 10, it is judged whether or not there is a request to output one page of image data to be previewed (Step S150). If it is judged that there is not such a request (NO in Step S150), the routine waits until such a request is issued. If it is judged that there is such a request (YES in Step S150), under the control of the CPU 10, parameter information of the image data is read out from the HDD 16 by the dosFS transfer mode (Step S151). In this embodiment, it is configured such that the procedure executed if image data is facsimile-outputted should be the top priority, meanwhile, the procedure executed if image data is outputted to the display 12 should be responsive to user panel operation. Therefore, a priority level of the dosFS transfer mode is set to "2". Further, it is configured such that data is read out by 32 KB by the dosFS transfer mode.

Subsequently, under the control of the CPU 10, a procedure to transfer data to/from the HDD 16 by the dosFS transfer mode is executed according to a flowchart shown in FIG. 17 (Step S122). This procedure will be detailed later.

In Step S153, under the control of the CPU 10, it is judged whether or not necessary parameter information of one page of image data is completely read out from the dosFS administration area 35. If it is judged that parameter information of the image data is not yet completely read out therefrom (NO in Step S153), the routine returns to Step S151 and repeats Steps S151 through S153 until it is completely read out. If it is judged that parameter information of the image data is completely read out therefrom (YES in Step S153), under the control of the CPU 10, a request to read out the image data from the HDD 16 is written in the HDD image transfer queue, with the priority level "2" (Step S154). Then the routine proceeds to Step S155.

In Step S155, under the control of the CPU 10, it is judged whether or not one page of image data is completely read out from the HDD 16.

If it is judged that the image data is not yet completely read out therefrom (NO in Step S155), the routine waits until it is completely read out. If it is judged that the image data is completely read out therefrom (YES in Step S155), under the control of the CPU 10, the readout image data is expanded by the compressor/expander 17 then outputted to the display 12 (Step S156). Then the routine returns to Step S150.

Procedure Executed if Image Data is Transferred Between HDD and Work Memory

Hereinafter, procedures executed if image data is transferred between the work memory 14 and the HDD 16, will be explained in details with reference to flowcharts shown in FIG. 17 and FIG. 18.

FIG. 17 is a flowchart showing a subroutine of the procedure executed if image data read out from a document is inputted, if image data received via the network is inputted, if facsimile-received image data is inputted, if image data is outputted to be printed, if image data is outputted via the network, if image data is facsimile-outputted, or if image data is outputted to be previewed. The subroutine is a procedure to transfer data to/from the HDD 16 by the dosFS transfer mode (Step S83, S93, S103, S122, S132, S142 or S152).

In Step S831 of FIG. 17, under the control of the CPU 10, it is judged whether or not the priority level of the dosFS transfer mode is "1" so that the maximum continuous transfer image data size could be changed depending on the priority level. If it is judged that the priority level is "1" (YES in Step S831), the maximum continuous transfer image data size is set to 8 KB, so that parameter information of the image data could be written in/read out on a priority basis (Step S833). Then the subroutine proceeds to Step S836. If it is judged that the priority level is not "1" (NO in Step S831), under the control of the CPU 10, it is judged whether or not the priority level of the dosFS transfer mode is "2" (Step S832). If it is judged that the priority level is "2" (YES in Step S832), under the control of the CPU 1, the maximum continuous transfer image data size is set to 16 KB (Step S834), then the subroutine proceeds to Step S836. If it is judged that the priority level is not "2" (NO in Step S832), under the control of the CPU 10, the maximum continuous transfer image data size is set to 32 KB (Step S835), so that the inputted image data could be written in or the image data to be outputted could be read out, on a priority basis. And then, the subroutine proceeds to Step S836.

In Step S836, under the control of the CPU 10, it is judged whether or not a HDD transfer exclusion semaphore is acquired, so that parameter information of the image data could be written in or read out from the HDD 16. The HDD transfer exclusion semaphore excludes a process to write in/read out parameter information and a process to transfer image data to/from the HDD 16 by the image data transfer mode, which is to be described later. By acquiring the semaphore, transfer by the dosFS transfer mode and transfer by the image data transfer mode are performed in alternate shifts.

If it is judged that the HDD transfer exclusion semaphore is not acquired (NO in Step S836), under the control of the CPU 10, the subroutine waits until it is acquired. If it is judged that the HDD transfer exclusion semaphore is acquired (YES in Step S836), then in the cases of the procedures executed if image data is inputted as shown in FIG. 10 through FIG. 12, parameter information of the image data is written in the dosFS administration area 35 of the HDD 16 (Step S837), under the control of the CPU 10. Meanwhile, in the cases of the procedures executed if image data is outputted as shown in FIG. 13 through FIG. 16, parameter information of the image data is read out from the dosFS administration area 35 of the HDD 16 (Step S837), under the control of the CPU 10.

Subsequently, the location of transferred image data is updated (Step S838), and it is judged whether or not the requested size (32 KB) of image data is completely transferred (Step S839).

If it is judged that the requested size of image data is not yet completely transferred (NO in Step S839), the subroutine returns to Step S836 and repeats Steps S836 through S839 until it is completely transferred. If it is judged that the requested size of image data is completely transferred (YES in Step S839), under the control of the CPU 10, the HDD transfer exclusion semaphore is released (Step S840), and the maximum continuous transfer image data size is set to 128 KB (Step S841), so that the image data could be more effectively transferred. Then the subroutine returns.

Figure 18:
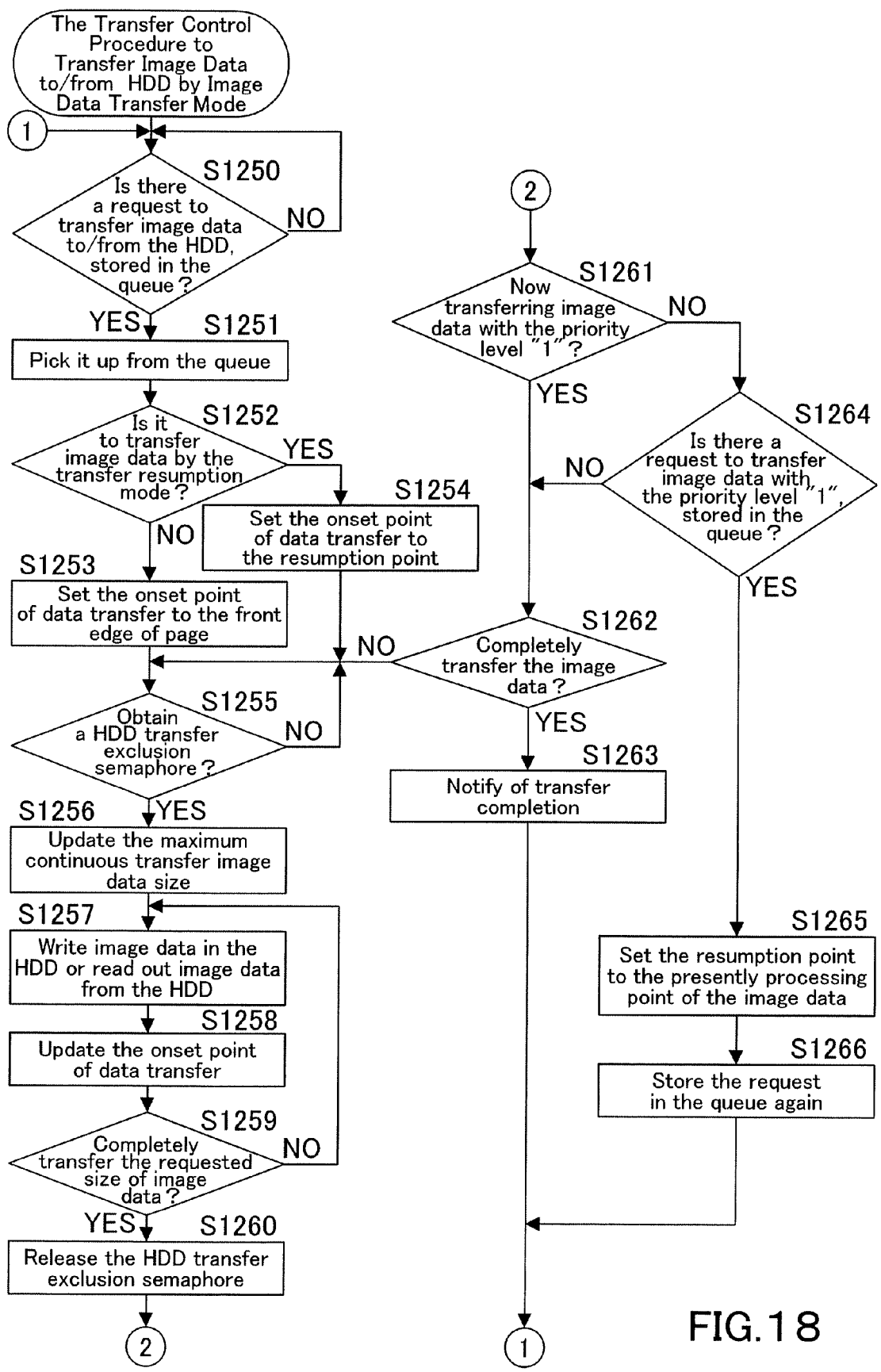
FIG. 18 is a flowchart to explain a transfer control procedure to transfer data to/from a HDD by the image data transfer mode.

FIG. 18 is a flowchart showing a procedure to transfer image data to/from the HDD 16 by the image data transfer mode. This procedure is activated by a task, in an initialization process of the main routine shown in FIG. 9. Therefore, this procedure can be executed simultaneously with the procedures executed if image data is inputted, which are shown in FIG. 10 through FIG. 12, or with the procedures executed if image data is outputted, which are shown in FIG. 13 through FIG. 16.

Under the control of the CPU 10, it is judged whether or not there is a request to transfer image data to/from the HDD 16, stored in the HDD transfer queue (Step S1250). If it is judged that there is not such a request stored in the HDD transfer queue (NO in Step S1250), the subroutine waits until such a request is stored in the HDD transfer queue, since such a request is not issued. If it is judged that there is such a request stored in the HDD transfer queue (YES in Step S1250), under the control of the CPU 10, the request is acquired from the HDD transfer queue (Step S1251). If there are such a plurality of requests stored in the HDD transfer queue, a request with the higher priority level is acquired on a priority basis as described above.

Subsequently, it is judged whether or not the request is to transfer image data by the transfer resumption mode (Step S1252). This judgment is necessary to resume transfer of image data with a low priority level, which is suspended if a request to transfer other image data is registered in the queue with a high priority level while the image data is being transferred with a low priority level.

If it is judged that the request is not to transfer image data by the transfer resumption mode (NO in Step S1252), under the control of the CPU 10, the onset point of data transfer is set to the front edge of the page of image data (Step S1253), then the subroutine proceeds to Step S1255. If it is judged that the request is to transfer image data by the transfer resumption mode (YES in Step S1252), the onset point of data transfer is set to the resumption point (Step S1254), then the subroutine proceeds to Step S1255.

In Step S1255, under the control of the CPU 10, it is judged whether or not a HDD transfer exclusion semaphore is acquired, so that the image data could be transferred between the work memory 14 and the HDD 16. The HDD transfer exclusion semaphore enables transfer of parameter information and transfer of image data to be performed in alternate shifts, like in the way as the previous procedure to transfer data by the dosFS transfer mode.

If it is judged that a HDD transfer exclusion semaphore is not acquired (NO in Step S1255), under the control of the CPU 10, the subroutine waits until it is acquired. If it is judged that a HDD transfer exclusion semaphore is acquired (YES in Step S1255), under the control of the CPU 10, the maximum continuous transfer image data size is updated (Step S1256). The maximum continuous transfer image data size corresponds to the value that is set in the previous procedure to transfer data to/from the HDD 16 by the dosFS transfer mode, and this value is stored in this Step.

Subsequently, in the case of the procedures shown in FIG. 10 through FIG. 12, which are executed if image data is inputted, the image data is written in the HDD 16 (Step S1257). Meanwhile, in the case of the procedures shown in FIG. 13 through FIG. 16, which are executed if image data is outputted, the image data is read out from the HDD 16 (Step S1257).

Then, the onset point of data transfer is updated (Step S1258), and it is judged whether or not the maximum continuous transfer image data size of the image data is completely transferred (Step S1259).

If it is judged that the maximum continuous transfer image data size of the image data is not yet completely transferred (NO in Step S1259), the subroutine returns to Step S1257 and repeats Steps S1257 through S1259 until it is completely transferred. If it is judged that the maximum continuous transfer image data size of the image data is completely transferred (YES in Step S1259), under the control of the CPU 10, the HDD transfer exclusion semaphore is released (Step S1260).

The maximum continuous transfer image data size is changed depending on the priority level of the dosFS transfer mode as mentioned above. Therefore, the greater maximum continuous transfer image data size is, the more image data is transferred continuously, which can reduce the time taken for transfer by the image data transfer mode with limited influence of transfer by the dosFS transfer mode. On the other hand, the smaller maximum continuous transfer image data size is, the less image data is transferred continuously, which can reduce the time taken for transfer by the dosFS transfer mode with limited influence of transfer by the image data transfer mode. In this regard, details will be provided later.

After the HDD transfer exclusion semaphore is released in Step S1260, it is judged whether or not image data is now being transferred with the priority level "1" (Step S1261).

If it is judged that image data is now being transferred with the priority level "1" (YES in Step S1261), the subroutine proceeds to Step S1262. If it is judged that image data is not being transferred with the priority level "1" (NO in Step S1261), under the control of the CPU 10, it is judged whether or not there is a request stored in the queue, with the priority level "1" (Step S1264). If it is judged that there is not such a request stored in the queue (NO in Step S1264), the subroutine proceeds to Step S1262.

If it is judged that there is such a request stored in the queue (YES in Step S1264), under the control of the CPU 10, the presently processing point of the image data is set as the resumption point and the setting is stored (Step S1265), so that the request with the priority level "1" could be executed on a priority basis, and the request is stored in the queue again (Step S1266). Then, the subroutine returns to Step S1250 and a request with the priority level "1" is read out from the HDD transfer queue again, then executed by interruption on a priority basis.

In Step S1262, under the control of the CPU 10, it is judged whether or not one page of image data is completely transferred. If it is judged that one page of image data is not yet completely transferred (NO in Step S1262), the subroutine returns to Step S1255 and repeats Steps S1255 through S1262 until it is completely transferred. If it is judged that one page of image data is completely transferred (YES in Step S1262), under the control of the CPU 10, a notification is transmitted to the display 12 to notify of transfer completion (Step S1263). Then the subroutine returns to Step S1250.

The procedures to transfer to/from the HDD 16 will be further detailed as following.

For example, if there is a request to input only image data read out by the image reader 24 as shown in FIG. 10, a priority level of the dosFS transfer mode is written as "3" (Step S82), then the procedure to transfer data to the HDD 16 by the dosFS transfer mode is executed in Step S83 (FIG. 17), and the maximum continuous transfer image data size is set to 32 KB, in Step S835.

In Steps S836 through S839, parameter information is written in the HDD 16 until a required size is reached. Since the required size of the dosFS transfer mode is set to 32 KB as mentioned above, parameter information is transferred until 32 KB is reached.

After the required size of parameter information of the image data is completely transferred, the maximum continuous transfer image data size is set to 128 KB in Step S841. In this way, parameter information is written by the dosFS transfer mode until one page is finished (Step S84 of FIG. 10). When one page is finished, a request to transfer image data to/from the HDD 16 is written in the HDD image transfer queue, with the priority level "2" (Step S85).

If a request to transfer image data to/from the HDD 16 is stored in the HDD image transfer queue with the priority level "2", judgment in Step S1250 in the procedure to transfer to/from the HDD by the image data transfer mode, which is shown in FIG. 18 and executed simultaneously with a procedure executed if image data read out from a document is inputted, results in "YES". Then, a HDD transfer exclusion semaphore is obtained in Step S1255, and the maximum continuous transfer image data size is updated in Step S1256. The current maximum continuous transfer image data size corresponds to the one set in advance in Step S841 of FIG. 17, thus it is set to 128 KB in Step S1256. Then the image data is transferred to the HDD 16 until 128 KB is reached.

Steps S1255 through S1262 are repeated until one page of image data is completely written in the HDD 16 (YES in Step S1262).

In this way, it is transferred until one page is finished, and when one page is finished (YES in Step S86 of FIG. 10 and YES in Step S1262 of FIG. 18), a request to input a following page of image data is executed, accordingly.

The following is an example in which image data happens to be facsimile-received while image data read out from a document is being transferred to the HDD 16 (is being written in the HDD 16) from the work memory 14.

In this example, the routine of FIG. 12 is activated (YES in Step S100), and a priority level of the dosFS transfer mode is written as "1" in Step S102. Subsequently, judgment in Step S831 results in "YES" and the maximum continuous transfer image data size is set to 8 MB in Step S833. Then the subroutine waits in Step S836 until a HDD transfer exclusion semaphore is acquired.

Image data read out from a document is transferred to the HDD 16 by 128 KB, the maximum continuous transfer image data size, until facsimile-received mage data is inputted. If facsimile-received image data is inputted, the maximum continuous transfer image data size is changed to 8 KB in Step S833 and it is updated as 8 KB in Step S1256 of FIG. 18. Then, 8 KB of the readout image data is completely transferred (YES in Step S1259), and the semaphore is released in Step S1260. After the semaphore is released, judgments in Step 1261, S1264 and S1262 result in "NO", and then the subroutine waits until a semaphore is acquired in Step S1255.

On the other hand, if the semaphore is released in Step S1260, judgment in Step S836 of FIG. 17 showing the procedure executed if facsimile-received image data is inputted, results in "YES". Then, parameter information is transferred to HDD 16 by 32 KB (the requested size) by the dosFS transfer mode.

If 32 KB of parameter information is completely transferred, the semaphore is released (Step S840), and the maximum continuous transfer image data size is set to 128 KB (Step S840). If parameter information of one page of image data is not yet completely transferred, judgment in Step S104 of FIG. 12 results in "NO", a priority level is written as 1 in Step S102, and the maximum continuous transfer image data size is set to 8 KB in Step S833 of FIG. 17. In other words, the maximum continuous transfer image data size is always 8 KB until parameter information of one page of the facsimile-received image data is completely transferred.

If the semaphore is released in Step S840, judgment in Step 1255 of FIG. 18 showing a procedure executed if image data read out from a document is inputted, which has been kept waiting for semaphore release, results in "YES". Then, the maximum continuous transfer image data size is updated as 8 KB in Step S1256, and the readout image data is transferred until 8 KB is reached.

As described above, under control, transfer of 8 KB of image data read out from a document and transfer of parameter information of 32 KB of facsimile-received image data are performed alternately, and thereby the parameter information of facsimile-received image data is transferred in a more expeditious way.

Figure 19:
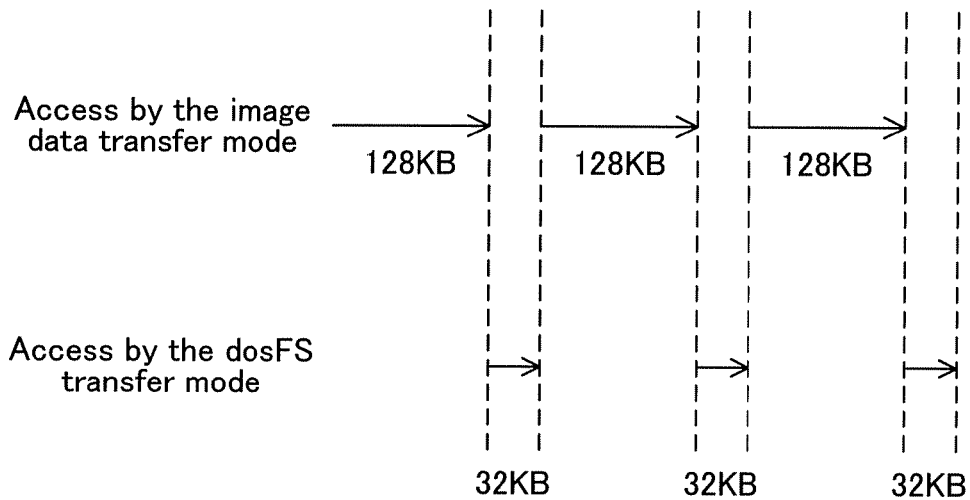
FIG. 19 is a view showing transfer operations indicated if the maximum continuous transfer image data size is fixed.

In another example of FIG. 19 in which a priority level of the dosFS transfer mode is not changed depending on image data and the image data is transferred by the maximum continuous transfer image data size that is not changed (128 KB for example), the image data is transferred by the maximum continuous transfer data size 128 KB meanwhile parameter information is transferred by the maximum continuous transfer data size 32 KB by the dosFS transfer mode, and thereby the image data is transferred on a priority basis.

Figure 20:
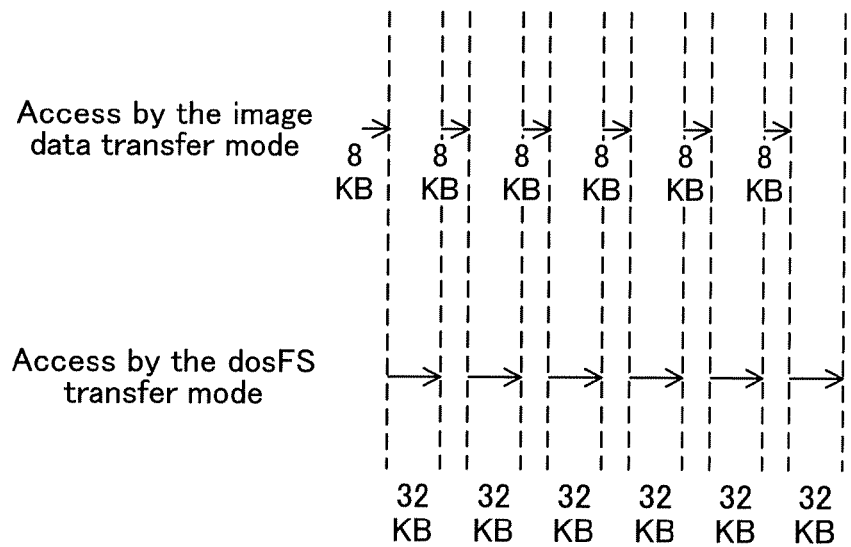
FIG. 20 is a view showing transfer operations indicated if the maximum continuous transfer image data size is changed depending on a priority level.

Contrarily, in this embodiment, if a request to facsimile-input or facsimile-output image data is issued while other image data (for example, image data read out from a document) is being stored in the HDD 16, transfer of 8 KB of the readout image data and transfer of 32 KB of parameter information of the facsimile-received image data or the image data to be facsimile-outputted by the DosFS transfer mode, are performed alternately as shown in FIG. 20. And thereby, parameter information is stored by the DosFS transfer mode in a more expeditious way.

As described above in this embodiment, even if a request to write parameter information of facsimile-received image data in the HDD 16 is issued or even if a request to read out parameter information of image data to be facsimile-transmitted from the HDD 16 is issued while other image data is being transferred to the HDD 16, the maximum continuous transfer image data size by which the image data is transferred thereto is compressed, and thereby parameter information of the facsimile-received image data or the image data to be facsimile-transmitted is written in/read out from the HDD 16 in a more expeditious way.

If parameter information of one page of facsimile-received image data is completely written in the HDD 16 (YES in Step S104 of FIG. 12), then in Step S105, a request to transfer the image data to the HDD 16 is written in the HDD image transfer queue, with the priority level "1". Subsequently, the judgment in Step S1264 (of FIG. 18) about the ongoing image data results in "YES", and a request to transfer the image data is registered in the queue by the resumption mode (Step S1266). Then the routine returns to Step S1250.

Since a request to transfer the facsimile-received image data is written in the transfer queue with the priority level "1", the request is picked up from the queue on a priority basis in Step S1251 of FIG. 18, and one page of the facsimile-received image data is completely written in the HDD 16. In this embodiment, the maximum continuous transfer image data size is already set to 128 KB in Step S841 (of FIG. 17) of the subroutine to transfer data by the dosFS transfer mode, and thereby the facsimile-received image data is transferred by this size in a more expeditious way.

If one page of the image data is completely transferred, transfer of the image data read out from a document, which request is re-registered in advance in the queue by the resumption mode, is resumed (YES in Step S1252).

As described above in this embodiment, even if a request to transfer facsimile-received image data to the HDD 16 is issued with a higher priority level while image data read out from a document is being transferred to the HDD16 with a lower priority level, transfer of the facsimile-received mage data interrupts transfer of the readout image data.

Advantages of this present invention will be further explained with reference to pattern diagrams shown in FIG. 21 and FIG. 22.

In these embodiments, facsimile-received image data and image data read out by the image reader 24 are transferred to the HDD 16, simultaneously.

Page 1 of image data read out by the image reader 24 is compressed and stored in the work memory 14 at the same time. After completion of storing, the image data is started to be transferred to (stored in) the HDD 16. And after Page 1 of the image data is completely transferred to (stored in) the HDD 16, Page 2 of image data is read out, compressed, stored in the work memory 14, and then transferred to (stored in) the HDD 16, which sequence is repeated about respective pages. Concretely, image data is intermittently transferred to the HDD 16 page by page, at the interval of time taking from reading out by the image reader 24 until transferring to the work memory 14.

Meanwhile, in the same way, facsimile-received image data is intermittently transferred to the HDD 16 page by page, at the interval of time taking from receiving until transferring to the work memory 14.

Under the condition described above, a request to transfer Page 1 of the facsimile-received image data to the HDD 16 is issued while Page 1 of the image data read out by the image reader 24 is being transferred to (stored in) the HDD 16.

Figure 21:
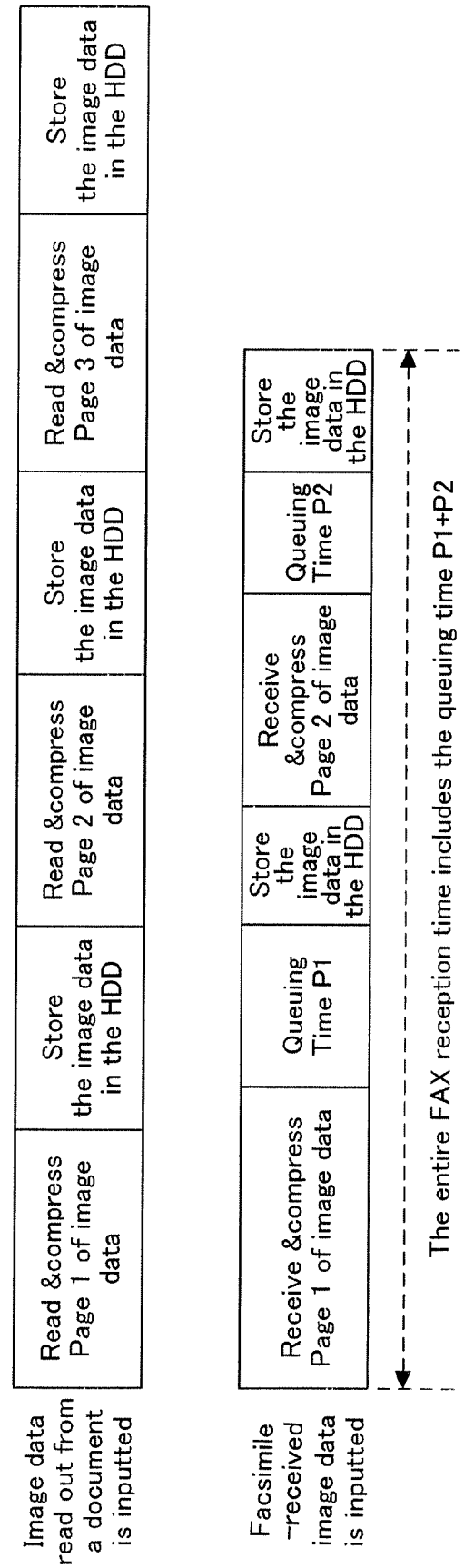
FIG. 21 is a view showing a conventional sequence executed if image data is facsimile-received while image data read out from a document is being inputted.

As shown in FIG. 21, according to a conventional embodiment, a request to transfer Page 1 of the facsimile-received image data to the HDD 16 is suspended for a queuing time P1, until Page 1 of the image data read out from a document is completely transferred to (stored in) the HDD 16. The queuing time P1 arises about respective pages of the facsimile-received image data. Therefore, according to this Figure, if two pages of image data are facsimile-received, transfer of the two pages of image data is suspended for the queuing time P1+P2.

Figure 22:
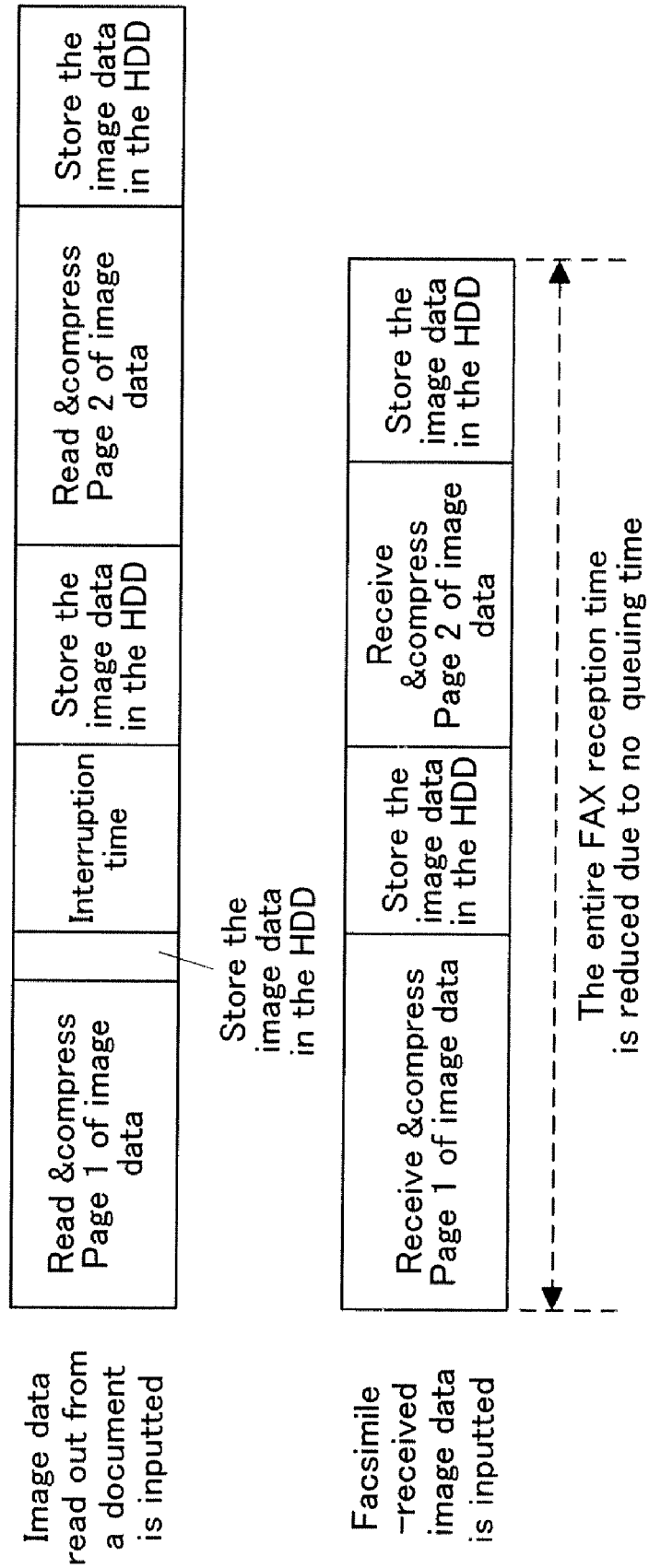
FIG. 22 is a view showing a sequence according to this embodiment, which is executed if image data is facsimile-received while image data read out from a document is being inputted.

Meanwhile, as shown in FIG. 22, according to an embodiment of the present invention, even while the image data read out by the image reader 24 is being transferred to (stored in) the HDD 16, it is interrupted by transfer of the facsimile-received image data and the facsimile-received image data is immediately transferred to the HDD 16 without a queuing time, which could save the processing time by the queuing time P1+P2.

Further, if one page of the facsimile-received image data is completely transferred, the transfer of the image data read out by the image reader 24, which is suspended by the interruption, is resumed. After the resumption, the image data read out by the image reader 24 can be continuously transferred until a request to transfer a following page of the facsimile-received image data to the HDD 16 is issued. However, after the resumption, if the image data read out by the image reader 24 is completely transferred to the HDD 16 before a request to transfer a following page of the facsimile-received image data to the HDD 16 is issued, the following page of the facsimile-received image data is read out, compressed and stored in the work memory 14.

As described above in this present embodiment, facsimile-received image data is immediately stored page by page without a queuing time, which could make the overall FAX reception time (communication time) shorter than that of the conventional embodiment. Therefore, this present embodiment could resolve the inconveniences that are productivity reduction caused by a long FAX reception time and a high communication cost charged to a sender FAX.

Further, if one page of facsimile-received image data is completely transferred, the transfer of the image data read out by the image reader 24, which is suspended by the interruption, is resumed. Therefore, this present embodiment could resolve the inconvenience in which the transfer of the image data read out by the image reader 24 is suspended by the interruption until all pages of facsimile-received image data is completely transferred.

Briefly, in this present embodiment, facsimile-received image data is transferred to the HDD 16 on a priority basis, and also, image data read out by the image reader 24 is transferred to the HDD 16 efficiently.

As explained above, the sequence of FIG. 22 is executed if image data is facsimile-received. However, this sequence is also executed if image data is facsimile-outputted. In this case, this embodiment could also resolve the inconveniences caused by a long FAX transmission time (communication time), which are a long occupation time of a receiver FAX and a high communication cost for the FAX communication. Further, this embodiment shows the case in which facsimile-received image data and image data read out from a document are transferred to the HDD 16, simultaneously. However, this embodiment also can be applied to the case in which facsimile-received image data and other image data that is not facsimile-inputted image data or image data to be facsimile-outputted, are transferred to/from the HDD 16, simultaneously.

Explained above is one embodiment of the present invention, and the present invention is not limited to this embodiment.

Concretely, in this embodiment above, facsimile-received image data or image data to be facsimile-transmitted is transferred between the work memory 14 and the HDD 16 with a higher priority level than other image data, but the present invention is not limited to this embodiment. For example, image data to be externally outputted or image data read out from an external PC also can be transferred to/from the HDD 16 with a higher priority level than other image data. Concretely, it also can be configured such that image data externally inputted/to be outputted is transferred between the work memory and the nonvolatile recording medium with a higher priority level than other image data, for a certain purpose, e.g. for the purpose of shortening the processing time of an external apparatus and the self apparatus, as much as possible.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
    a volatile recording medium that stores image data in itself;
    a nonvolatile recording medium that stores image data in itself;
    a transfer portion that transfers image data page by page between the volatile recording medium and the nonvolatile recording medium;
    a controller that suspends transfer of one page of first image data, lets transfer of one page of second image data interrupt, and executes transfer of that page of the second image data on a priority basis, if a request to transfer that page of the second image data is issued with a higher priority level than that page of the first image data while that page of the first image data is being transferred by the transfer portion, and then, resumes transfer of an untransferred portion of that page of the first image data after that page of the second image data is completely transferred.

2. The image processing apparatus as recited in claim 1, wherein the first image data and the second image data consist of a plurality of pages, and the transfer portion intermittently transfers page by page the first image data and the second image data between the volatile recording medium and the nonvolatile recording medium.

3. The image processing apparatus as recited in claim 1, wherein the second image data corresponds to facsimile-received data.

4. The image processing apparatus as recited in claim 1, wherein the second image data corresponds to data to be facsimile-transmitted.

5. An image data transfer control method comprising:
    suspending transfer of one page of first image data that is transferred page by page, letting transfer of one page of second image data that is also transferred page by page, interrupt, and executing transfer of that page of the second image data on a priority basis, if a request to transfer that page of the second image data is issued with a higher priority level than that page of the first image data while that page of the first image data is being transferred between a volatile recording medium and a nonvolatile recording medium storing image data in their selves; and
    resuming transfer of an untransferred portion of that page of the first image data after that page of the second image data is completely transferred.

6. The image data transfer control method as recited in claim 5, wherein the first image data and the second image data consist of a plurality of pages, and the first image data and the second image data are intermittently transferred page by page between the volatile recording medium and the nonvolatile recording medium.

7. The image data transfer control method as recited in claim 5, wherein the second image data corresponds to facsimile-received data.

8. The image data transfer control method as recited in claim 5, wherein the second image data corresponds to data to be facsimile-transmitted.

9. An image data transfer control program stored in a non-transitory computer readable recording medium to make a computer of an image processing apparatus execute:
    suspending transfer of one page of first image data that is transferred page by page, letting transfer of one page of second image data that is also transferred page by page, interrupt, and executing transfer of that page of the second image data on a priority basis, if a request to transfer that page of the second image data is issued with a higher priority level than that page of the first image data while that page of the first image data is being transferred between a volatile recording medium and a nonvolatile recording medium storing image data in their selves; and
    resuming transfer of an untransferred portion of that page of the first image data after that page of the second image data is completely transferred.

10. The image data transfer control program as recited in claim 9, wherein the first image data and the second image data consists of a plurality of pages, and the first image data and the second image data are intermittently transferred page by page between the volatile recording medium and the nonvolatile recording medium.

11. The image data transfer control program as recited in claim 9, wherein the second image data corresponds to facsimile-received data.

12. The image data transfer control program as recited in claim 9, wherein the second image data corresponds to data to be facsimile-transmitted.

* * * * *